United States Patent
Treadway et al.

(10) Patent No.: US 10,025,455 B2
(45) Date of Patent: Jul. 17, 2018

(54) METHOD, APPARATUS AND SYSTEM FOR A GRAPHICAL USER INTERFACE

(71) Applicant: Sphere Technology Limited, Edinburgh (GB)

(72) Inventors: Oliver Treadway, Edinburgh (GB); Michael Kruger, Perth (AU)

(73) Assignee: SPHERE TECHNOLOGY LIMITED, Edinburgh (GB)

(*) Notice: Subject to any disclaimer, the term of this patent is extended or adjusted under 35 U.S.C. 154(b) by 416 days.

(21) Appl. No.: 13/690,257

(22) Filed: Nov. 30, 2012

(65) Prior Publication Data

US 2013/0091445 A1    Apr. 11, 2013

Related U.S. Application Data

(63) Continuation of application No. PCT/EP2011/059022, filed on Jun. 1, 2011.

(30) Foreign Application Priority Data

Jun. 1, 2010   (GB) .................................. 1009182.5

(51) Int. Cl.
   *G06F 3/0481*   (2013.01)
   *G06T 11/20*   (2006.01)
   *G06F 9/451*   (2018.01)

(52) U.S. Cl.
   CPC ........ *G06F 3/04815* (2013.01); *G06F 3/0481* (2013.01); *G06F 9/451* (2018.02);
   (Continued)

(58) Field of Classification Search
   CPC ....... G06F 2203/04802; G06F 3/04815; G06T 2210/12
   (Continued)

(56) References Cited

U.S. PATENT DOCUMENTS 5,515,486 A   5/1996 Amro et al.
6,832,129 B2 * 12/2004 Lesh ....................... B65B 57/10
                                                    414/273
(Continued)

FOREIGN PATENT DOCUMENTS

GB   2440197 A   1/2008

OTHER PUBLICATIONS

International Search Report and Written Opinion for PCT/EP2011/059022 dated Sep. 19, 2011.
(Continued)

*Primary Examiner* — Sherrod Keaton
(74) *Attorney, Agent, or Firm* — EIP US LLP

(57) ABSTRACT

A computer-implemented method of positioning a set of objects for display on a user interface, the user interface being generated on a surface of a three-dimensional structure, each member of the set of the objects having a size in at least two dimensions, at least some of which dimensions vary between the objects, is provided. The method includes assigning the set of objects to a two-dimensional portion having a predetermined size, for each as yet unpositioned object in the set of objects, performing a positioning process, the positioning process comprising identifying object occupancy in the portion and allocating the object to a position within the portion on the basis of a largest dimension of the object and unoccupied space in the portion, and mapping the allocated positions to a corresponding coordinate on the surface of the three-dimensional structure.

27 Claims, 39 Drawing Sheets

(52) U.S. Cl.
CPC .. *G06T 11/206* (2013.01); *G06F 2203/04802* (2013.01); *G06T 2210/12* (2013.01)

(58) Field of Classification Search
USPC .......................................................... 715/762
See application file for complete search history.

(56) References Cited

U.S. PATENT DOCUMENTS

| | | | |
|---|---|---|---|
| 2001/0028369 A1* | 10/2001 | Gallo | G06F 3/04815 715/848 |
| 2001/0048433 A1 | 12/2001 | Rubin | |
| 2003/0167466 A1 | 9/2003 | Nakamura et al. | |
| 2005/0183041 A1* | 8/2005 | Chiu | G06F 3/04815 715/850 |
| 2006/0274060 A1 | 12/2006 | Ni et al. | |
| 2008/0013860 A1* | 1/2008 | Blanco | G06F 8/38 382/285 |
| 2010/0217650 A1* | 8/2010 | Hartnell | G06Q 10/04 705/7.29 |

OTHER PUBLICATIONS

Lesh et al., "New Heuristic and Interactive Approaches to 2D Rectangular Strip Packing", ACM Journal of Experimental Algorithmics, vol. 10, No. 1-2, Dec. 1, 2005, pp. 1-18.
Dmitrieva et al., "Different Geometries in Ontology Visualization", Proc. SPIE vol. 7530, Visualization and Data Analysis 2010, 753007, Jan. 18, 2010, pp. 8-10.

\* cited by examiner

METHOD, APPARATUS AND SYSTEM FOR A GRAPHICAL USER INTERFACE

CROSS REFERENCE TO RELATED APPLICATIONS

This application is a Continuation of international patent application PCT/EP2011/059022, filed on Jun. 1, 2011, which claims priority to foreign patent application GB 1009182.5, filed on Jun. 1, 2010, the contents of which are hereby incorporated by reference herein in their entirety.

TECHNICAL FIELD

The present invention relates to a method, system and apparatus for generating a graphical user interface.

BACKGROUND

An electronic interface presents information relating to items of interest to a user via a display interface, which is typically coupled to, or part of, a computing device. In view of the sheer volume of information that is available in electronic form, the use of electronic interfaces is very wide ranging. For example, such interfaces are used to display search results returned in response to a query received from a user, to display objects and information that is remotely accessible, either via web sites or via private networks, and of course to view information stored locally on the computing device.

When the information to be presented comprises items for the purposes of user selection from the items, the information is typically organised in categories accessible by a hierarchy of menus. However, a hierarchically-driven menu is not intuitive and is difficult to navigate through for the purposes of finding a particular item of interest.

Accordingly, it is desirable to provide an improved user interface that is intuitive and easily navigable.

SUMMARY

In accordance with aspects of the present invention there is provided a method, system and computer program according to the appended claims.

More specifically, a first aspect of the invention provides a computer-implemented method of positioning a set of objects for display on a user interface, the user interface being generated on a surface of a three-dimensional structure and each member of the set of the objects having a size in at least two dimensions, at least some of which dimensions vary between the objects, the method comprising:
  assigning the set of objects to a two-dimensional portion having a predetermined size;
  for each as yet unpositioned object in the set of objects, performing a positioning process, the positioning process comprising identifying object occupancy in the portion and allocating the object to a position within the portion on the basis of a largest dimension of the object and unoccupied space in the portion; and
  mapping the allocated positions to a corresponding three-dimensional coordinate on the surface of the three-dimensional structure.

Embodiments of the invention thus provide a two-step process for positioning a set of objects having a non-uniform size in a three-dimensional interface: the first step involves positioning individual objects within a two dimensional portion, and the second step involves projecting the two dimensional object positions to three dimensional coordinates. When the objects are of a non-uniform size, which is to say that the dimensions of the objects vary within the set, the positioning of objects within the two-dimensional portion presents technical challenges, as the objects cannot be distributed equally within the portion. Embodiments of the invention provide a solution to this problem by allocating positions based on their relative size and proportions, and their relationship to other objects in the set, according to a selected dimension (said dimension being some meta-data attached to the object) and the space available in the portion.

Presenting the objects within a surface of a three-dimensional structure has the advantage that more objects can be viewed by the user than is possible if the objects are presented in a conventional two-dimensional interface, and the three-dimensional structure makes it easier for users to locate and interact with the objects than when using a conventional two-dimensional interface. The user interface is configured with input controls that enable the user to rotate, zoom into, and scroll between objects: since the objects are mapped to a three dimensional continuum, the interface does not have an end point, meaning that the interface can be rotated without limitation, and with objects being selectable at each juncture.

Preferably the method further comprises assigning each of the objects to one of a plurality of subsets of objects on the basis of a characteristic of the objects, and performing the positioning process for each subset of objects such that the positioning process comprises:
  for each of an as yet unpositioned subset of objects:
    identifying object occupancy in the portion; and
    allocating the objects in the as yet unpositioned subset of objects to a position within the portion on the basis of a dimension of a largest object of the as yet unpositioned subset of objects and unoccupied space in the portion, the allocated positions being aligned along one dimension of the portion.

The characteristic can be an intrinsic or external characteristic of the object; when the objects relate to products, the extrinsic characteristics describe external characteristics of the product, such as manufacturer, price, place of origin, availability, promotional offering associated with the product, quality, rating and product category such as dairy, meat, etc. The intrinsic characteristics of the products correspond to the inherent characteristics of the object, and comprise parameters such as colour, material, texture, scent, taste, weight, ingredients, height, width, depth, volume, area, shape and perimeter. Thus by assigning objects to subsets on the basis of a particular characteristic, and then applying the positioning process successively, to each subset of objects, the objects are positioned in an intuitive manner.

Preferably objects are firstly ordered on the basis of an extrinsic or an intrinsic characteristic thereof to form the subsets of objects, and the ordering is used to control the order in which the subsets of objects are positioned by the positioning process. This ordering of objects can be achieved using a constraint that has a value between 0 and 1: when the constraint value is 1 for a given characteristic, positions are assigned to objects within bands for that given characteristic (so-called "100% strictness") and secondly according to size; when the constraint value is 0 for the given characteristic, positions are assigned to objects on the basis of size of the objects alone (so-called "zero strictness"). For a value somewhere in between 0 and 1, objects will be approximately ordered according to bands for the given characteristic, and by height within those bands, so as to make the best use of the space. This enables the positioning process to be flexible in the degree to which the ordering is utilised when positioning objects, and reflects the fact that there is a tradeoff between users appreciating the presentation of objects according to a cognitively attractive ordering and the feasibility of packing objects in this way.

Various known 2D bin-packing algorithms can be applied to position the objects within a portion, whether filling the portion from the bottom-up, top-down, or centre-out. A benefit of the latter approach emerges in the event that the three-dimensional structure providing the three dimensional surface is a radially-symmetrical structure, since objects can be positioned within a portion assuming an infinite amount of space in the vertical direction. Further, it results in the objects being naturally sorted by the characteristic so that the objects of most interest (eg: when sorting by price, the cheapest) are positioned at the equator, and hence in the centre of the screen, whilst the objects with which the user is least likely to interact are positioned out of the way at the "poles".

In one arrangement, the method comprises configuring the portion into a plurality of parts, and the positioning process comprises:

for each of an as yet unpositioned subset of objects:
identifying object occupancy in the plurality of parts and selecting a part for positioning of the as yet unpositioned subset of objects on the basis of the identified object occupancy;
allocating at least some of the objects in the as yet unpositioned subset of objects to a position within the selected part on the basis of a dimension of a largest object of the as yet unpositioned subset of objects and unoccupied space in the selected part, the allocated positions being aligned along one dimension of the portion; and
allocating any remaining unpositioned objects in the subset of objects to a position within the selected part or within an unselected part, based on object occupancy resulting from the allocated positions.

Configuring the portion into two or more parts provides fine-grained control over the positioning process, since it more easily accommodates a set of objects that vary considerably in size within the set. When this approach is used, the portion has a defined boundary in both dimensions; as a result, it is possible that objects in a given set cannot be positioned wholly within the portion. For such configurations, embodiments of the invention advantageously involve monitoring the cumulative dimension of the positioned objects, and, when the cumulative dimension exceeds a predetermined threshold value corresponding to a dimension of the portion, the method comprises allocating as yet unpositioned objects to a different said portion. The controlling dimensions could be the height of objects, and the height of a given portion, as it is to be projected onto the three-dimensional surface; preferably the objects are packed within the portion in accordance with a packing algorithm, which seeks to optimise the number of objects located within the portion, while maintaining separation therebetween.

In one arrangement the dimensions of the objects are defined according to a two-dimensional bounding polygon which completely encloses a two-dimensional projection of a three dimensional representation of a given object, thereby ensuring that the packing algorithm can successfully achieve the objective of packing objects close together while avoiding overlap between objects when they are rendered. The bounding polygon can be any shape, and is configured so as to balance the constraint between wasted space within a portion and computational complexity: a rectangular bounding polygon, for example, simplifies the computational complexity of the packing step, but it may incur wastage in packed space within a given portion, particularly for objects of awkward shape such as designer clothing items. In applications in which the objects are for purchase and consumption (e.g. food), since these items are typically of a regular size, a rectangular bounding polygon is satisfactory.

Preferably the method is applied to a plurality of sets of objects, each associated with a different portion and a different category of objects (as derived from the characteristics of objects), and the objects of the different sets are allocated to positions that are mapped to a distinct set of coordinates in three dimensional space. The various portions can be of the same size or of varying sizes, depending on the number of objects in the category; once "packed" with objects, the portions can be positioned adjacent one another in two dimensional space as a function of e.g. a specified relationships between the categories, prior to being mapped to the three dimensional surface. The relationships can be specified by a user and/or by an external entity. Conveniently, category information in the form of characteristics is linked to the objects and available from a database which may be maintained by a third party.

In at least some embodiments, the method comprises scaling the size of each object in the set of objects in relation to a first object and a second object in the set, the first object having a largest value of a selected characteristic and the second object having a smallest value of said selected characteristic. Objects can be scaled in this manner according to characteristics such as size, price, quality colour, rating etc.: this enables relationships between the objects in a given portion to be presented visually, providing immediate feedback to the user. For example, scaling according to price provides a means for a user to immediately identify items that are relatively more, or less, expensive, while scaling according to size ensures that all of the objects can be accommodated within the associated portion and ensures that the smaller objects can be viewed at a sensible size. The scaling step is particularly advantageous when performed on the basis of extrinsic characteristics such as price, rating, quality, since these are parameters that the user may not be able to identify immediately from visual inspection of the objects.

Once objects have been allocated positions, the positions are projected from a two dimensional surface onto said surface of the three-dimensional structure on the basis of the curvature of the surface. For example, when the three-dimensional structure is a sphere, and the surface is an internal surface of the sphere, the projection step could utilise the Sanson-Flamsteed map projection, which is an equal-area map projection which shows parallels and the equator as straight lines and other meridians as curves. Other three-dimensional structures can be used as projection targets, including structures such as cylinders, ellipsoids, cuboids, and vases—each requiring its own two-dimensional to three-dimensional projection. For irregular objects, the projection of objects can vary depending on where the objects are on the two dimensional surface, relative to the curvature of the three-dimensional surface.

An interface is then generated, comprising the three-dimensional surface, complete with objects, and optionally their three-dimensional image representations thereof, these having been retrieved and/or generated on the basis of the object data. For example, objects can be rendered in real time using QuickTime™ software. The method then involves displaying a portion of the user interface on the display of the user terminal from the perspective of a virtual camera located within the three-dimensional structure. In preferred embodiments the virtual camera is located between half a radii and one radii from the centre of the three-dimensional structure, pointing directly through the centre point of the three-dimensional structure so that the camera target is one-and-a-half to two radii away from the camera. Positioning of the virtual camera in this way reduces distortion of objects that lie towards the extents of the display of the user terminal.

The objects can be rendered together with images corresponding to additional interface information such as selection boxes, which enable the user to manipulate any given object—e.g. so as to zoom in, select "others like this", purchase items, and the like.

The size of the interface can be scaled according to the size of the display device on which the interface is to be presented, and the interface as a whole can be rotated and zoomed into and out of by the user using standard user interface display controls. This enables the user to effectively manipulate the aspect, size and actual objects that the user is viewing at any given time.

In general, the afore-mentioned steps generate an interface for display on visual display devices such as a desktop computer, a laptop, a smart phone such as an iPhone™ an iPad™ device, a Personal Digital Assistant (PDA) device, a tablet device, a media player, a television and a point-of-sale terminal.

Further aspects of the invention provide a distributed system configured to perform the afore-mentioned functionality. The positioning process can be performed by an object positioning engine, which, together with a data processing engine for performing the object categorisation step, can be configured on a server system remote from the terminal device. In one exemplary such server system, the data processing engine and the object positioning engine communicate via a network communications channel such as a Local Area Network (LAN) or Wide Area Network (WAN) connection between servers operating therein. Alternatively, the data processing engine and the object positioning engine could communicate via an Internet communications channel. In either scenario, the rendering of the objects onto the three-dimensional surface can be performed by a rendering engine configured on the terminal device or by a rendering engine configured on a server separate from said server system. In yet a further alternative, the data processing engine, the object positioning engine and the rendering engine are all configured on the terminal device.

In addition, there is provided a suite of computer programs for execution on a distributed computing system to implement a method of positioning a set of objects for display in an interface on a visual display device in the manner described above.

Further features and advantages of the invention will become apparent from the following description of preferred embodiments of the invention, given by way of example only, which is made with reference to the accompanying drawings.

DETAILED DESCRIPTION

Figure 1:
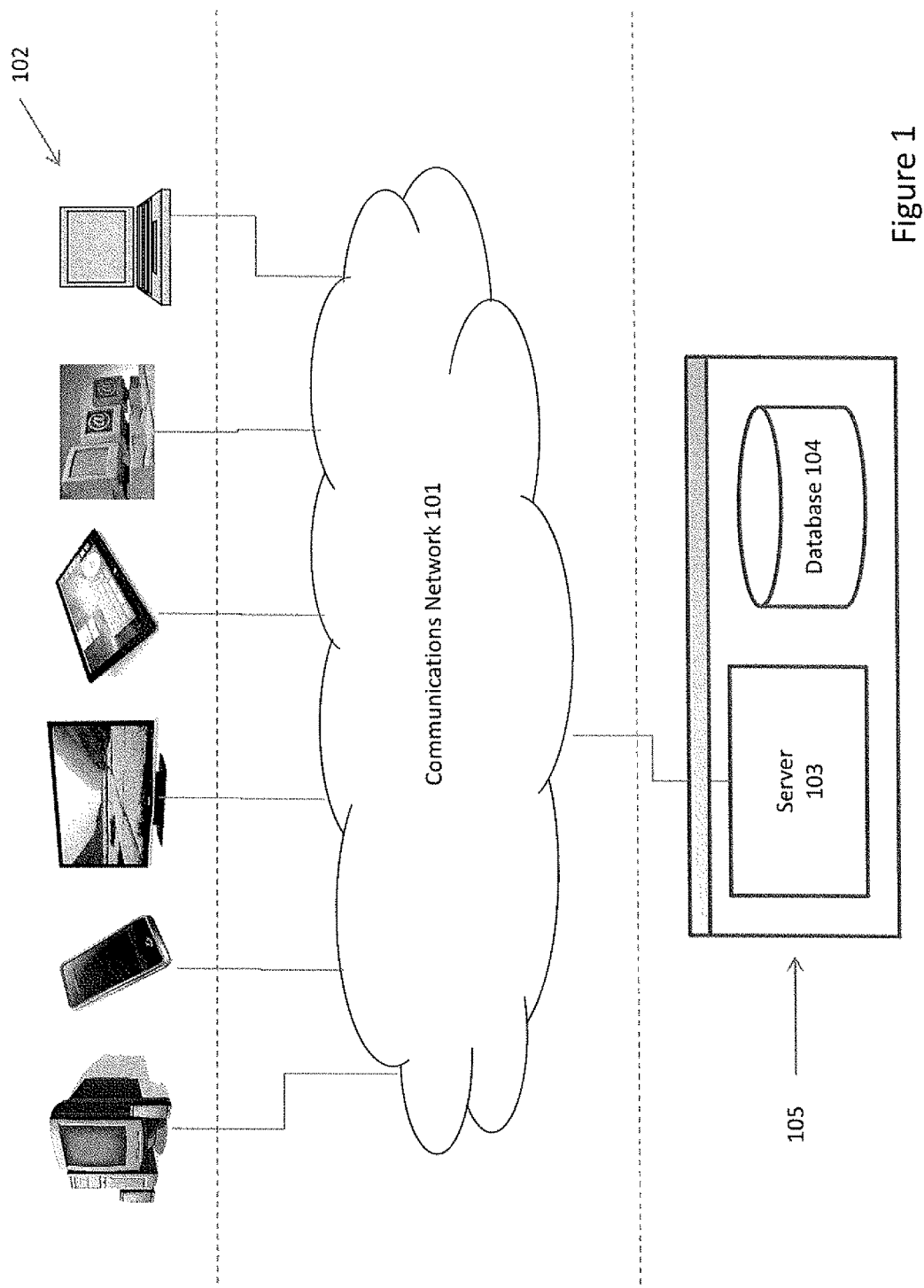
FIG. 1 is a schematic diagram of a network environment.

Embodiments described herein are concerned with the generation of an interface, such as a graphical user interface or a user interface. More specifically, embodiments are concerned with pictorially and intuitively positioning objects on a user interface. The processing steps involved in the generation of the interface is described in detail below, but first an overview of a network environment within which conventional display arrangements, and indeed embodiments of the invention can operate, is described with reference to FIG. 1, which shows a block diagram illustrating a communications network 101 through which a server 103 presents an interface to a client device 102.

The communications network 101 is configured to enable communication between the client devices 102 and the server 103, which may be a single server device or a cluster of servers, commonly referred to as a server system. The network 101 can be a Local Area Network (LAN) or a public network such as the Internet, or a combination of both. The client device 102 is typically a user terminal that is capable of generating an interface on an associated display device. Without limitation, the client devices 102 can include a desktop computer, a laptop, a smart phone such as an iPhone™, an iPad™ device, a Personal Digital Assistant (PDA) device, a tablet device, a television and a point-of-sale terminal. Conventional interfaces present information to the user organised in categories on a flat two dimensional interface rendered on a user display. To further improve the user experience, embodiments of the invention provide a means for generating the interface on one or more surfaces of a three-dimensional structure, thereby enhancing the user experience provided by a conventional flat two dimensional interface.

The server 103 may hold data corresponding to objects to be displayed in internal storage means or the data may be stored in a separate database 104. The data corresponding to the objects may alternatively be stored on the client device 102, which has a local storage device that can be updated periodically by the database 104. A display interface is presented on the user display in response to a user request. In arrangements in which the client device 102 does not have local access to the object data, the server 103 retrieves the object data from the database 104, uses the object data to determine a position for objects on a surface of a three-dimensional structure, and presents the surface, complete with objects, on the interface via a display interface. In an alternative arrangement, such as where the client 102 has direct access to the object data, the client 102 retrieves the object data from local storage prior to determining a position for the objects on the three-dimensional surface on the interface. Prior to the presentation of the interface, the client 102 may update item data, such availability, new items, etc, from the database 104.

Figure 2:
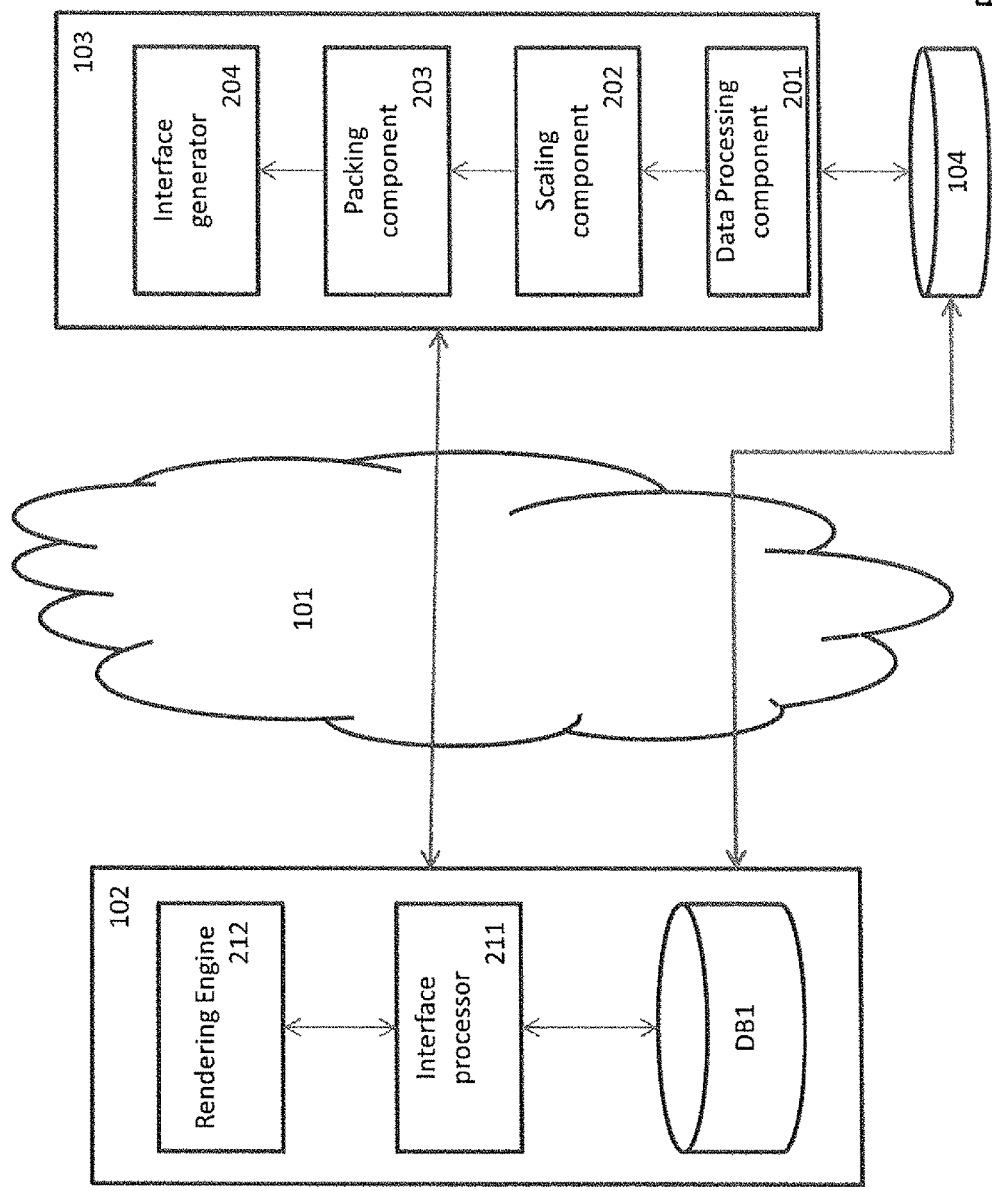
FIG. 2 shows a user terminal configured to communicate with a server system, each of which is configured with software components according to an embodiment of the invention.

Turning to FIG. 2, an embodiment of the invention will now be described with reference to an example in which the objects to be rendered are suitable for selection by a user. In this embodiment, processing is distributed between the client 102 and the server 103: specifically, the server 103 comprises a combination of processing components including standard operating system components, memory, processor, input/output interfaces, and permanent storage (not shown). In addition, when configured according to embodiments of the invention, the server 103 comprises a data processing component 201, a scaling component 202, a packing component 203 and an interface generator 204, which enable the server 103 to generate an interface on the surface of the three-dimensional structure.

In addition to conventional components, the client 102 comprises database DB1 that is configured to hold data in relation to the generated interface and a set of objects that are to be presented on the interface. As discussed above, the database 104 may periodically update data held in the database DB1 or the database DB1 may acquire data in relation to the interface and the set of objects in response to a predetermined event, such as invocation of the interface by the user. As will be appreciated, the database DB1 may be located internally or externally to the client 102.

The client 102 comprises an interface processor 211, which performs any client-side processing for presenting the interface to the user. The interface processor 211 may be supplied to the client 102 as part of a customised application configured to present the interface to the user, or may be supplied to the client 102 during a process of generating the interface. The client 102 also comprises a rendering engine 212 that is capable of rendering the set of objects that are to be rendered on the surface of the three-dimensional structure to the user.

While FIG. 2 shows the distribution of processing components between the client 102 and server 103, in an alternative arrangement the client 102 could be configured with components 201-204 in addition to those shown in the Figure. Thus in this arrangement, the client device 102 is capable of generating an interface according to embodiments of the invention, without any involvement from the server 103.

Figure 3:
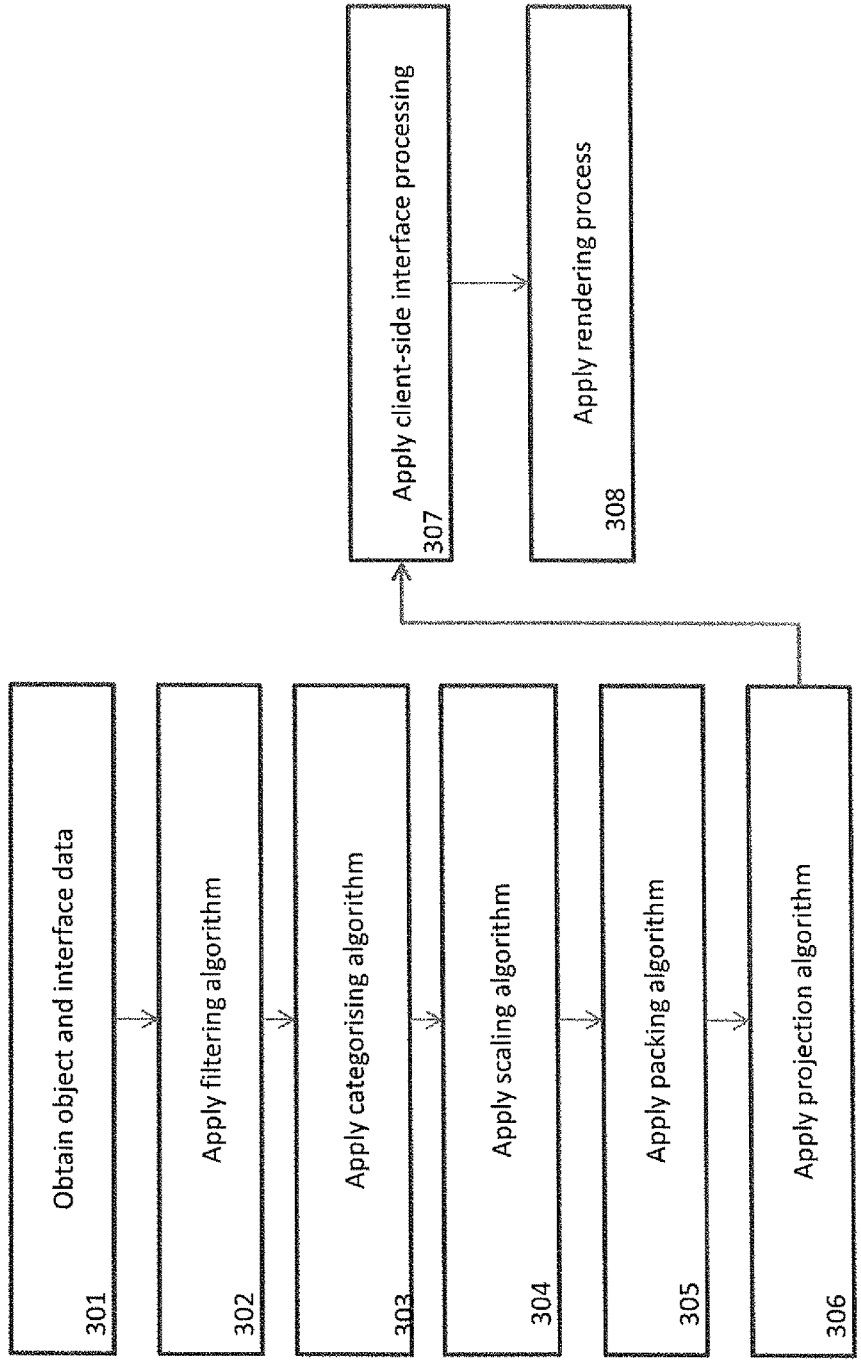
FIG. 3 is a flow diagram showing the steps performed to generate an interface according to an embodiment of the invention.

An overview of the steps involved in generating the interface on the surface of the three-dimensional structure in accordance with the embodiments of the invention will now be described with reference to FIG. 3. As discussed above, the interface can be presented to the user via a generic software application, such as a web browser, or via a customised application. In the event that the interface is provisioned by the server 103 to the client 102 via the communications network 101, the data processing component 201 retrieves data relating to the set of objects that are to be presented on the interface from the database 104 at step 301.

The database 104 stores object information, commonly referred to as meta-data, e.g. in the form of a data structure, which defines extrinsic and intrinsic characteristics of the objects. When the objects are representative of products for selection and purchase, the extrinsic characteristics of the product relate to the external characteristics of the product, such as manufacturer, price, place of origin, availability, promotional offering associated with the product, quality, rating and product category such as dairy, meat, etc. These extrinsic characteristics may include characteristics that are user defined and/or defined by an external source such as a merchant. The intrinsic characteristics of the products correspond to the inherent characteristics of the object, and comprise parameters such as colour, material, texture, scent, taste, weight, ingredients, height, width, depth, volume, area, shape and perimeter. These lists of characteristics are to be understood as being exemplary and non-exhaustive. In addition the database 104 may hold data relating to a given user associated with client 102 in a user profile of the given user. The user profile of the given user may be created in response to a registration request by the given user, or the user profile may be generated by monitoring interactions of the given user with the interface. The server 103 may additionally utilise video data acquisition capabilities on the client 102 to acquire physical attributes of the given user.

Step 301 may also involve the data processing component 201 retrieving, e.g. from database 104, data defining the surface of the three-dimensional structure on which the interface is presented to the user. The three-dimensional surface corresponds to an internal surface of any hollow object, such as a cuboid, a sphere, an oval, an ellipsoid, a vase, and the data describing the surface could be specific to a given merchant and/or user.

The data processing component 201 can use at least one selection criterion to determine which objects to display in the interface. The selection criterion may factor in user defined and/or merchant-defined conditions, and is utilised by a filtering algorithm (step 302) forming part of the data processing component 201. Filtering on the basis of the given user enables removal of irrelevant objects from the interface, such as a comb for a bald user. In an exemplary embodiment, such filtering is applied to comply with national laws, such as prohibition from selling alcohol to underage users.

Figure 4:
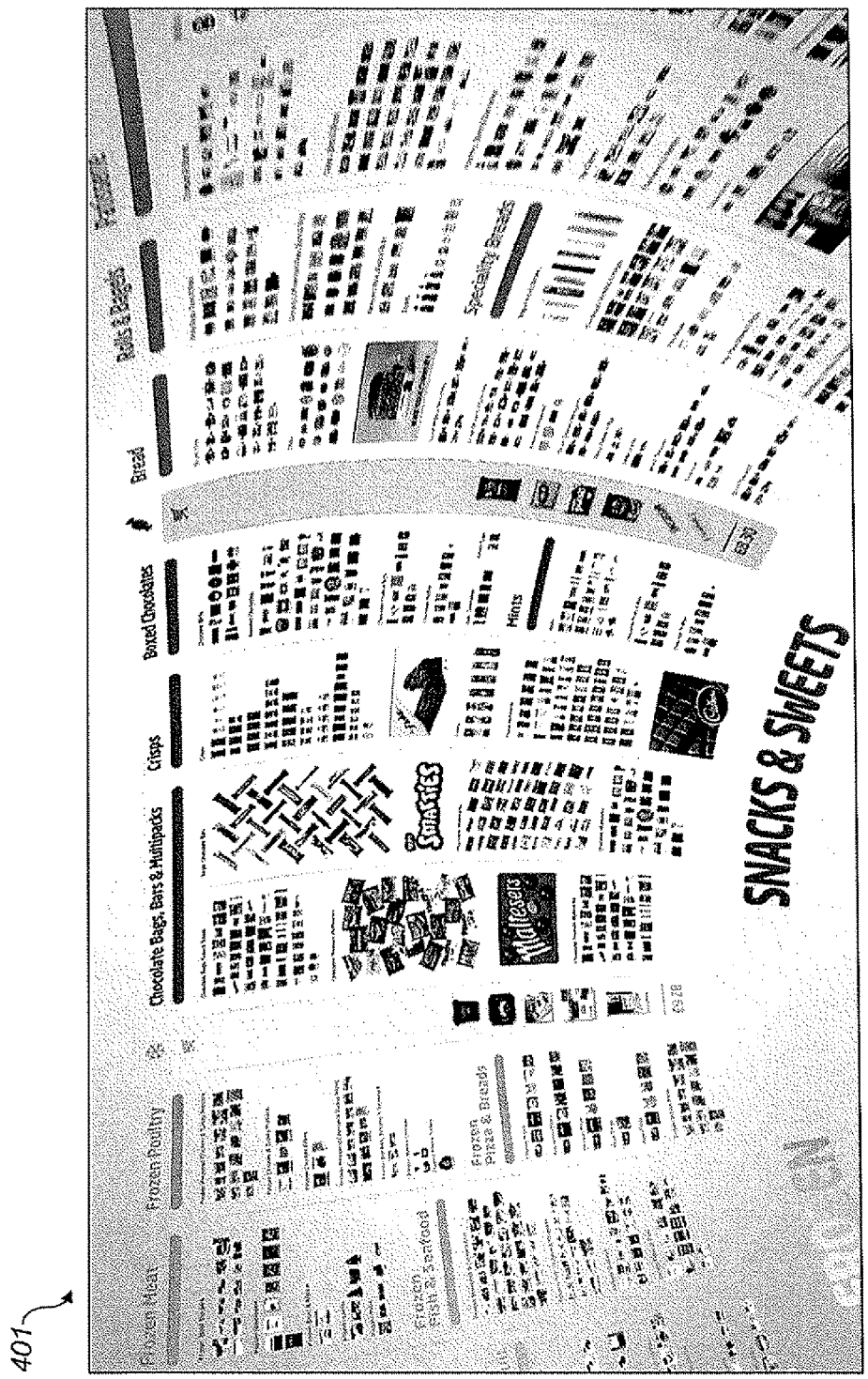
FIG. 4 is an example interface generated according to an embodiment of the invention.

Once the objects have been filtered in the manner described above, the positioning of the objects that have been selected at step 302 is determined, in relation to the surface of the three dimensional structure. In an exemplary embodiment the surface on which the objects are to be placed is represented by a plurality of two dimensional portions, each of which has an associated dimension, and within which the objects are to be placed. An example representation of the set of objects on an internal surface 401 of a radially symmetrical three-dimensional structure is shown in FIG. 4. In the example of FIG. 4, the three-dimensional structure is a hollow sphere, and the dimension referred to above is a circumferential dimension which is aligned with a vertical axis of the sphere.

Turning back to FIG. 3, for applications in which the objects to be displayed can be categorised, in this first step of the positioning process each of the objects from the set of objects is assigned to a category from a plurality of categories on the basis of one or more of the above-mentioned extrinsic characteristics of the objects by the data processing component 201 (step 303). Since, as described above, any given portion is effectively an area that will be mapped onto on the three dimensional surface, grouping objects together based on category means that all objects in any given category will be displayed within a particular portion on the three dimensional surface. Thus, if the categorisation is based on object colour, the result of step 303 would be that all yellow objects are grouped together and associated with a particular portion. A group of objects constitutes a set of objects, and the terms "group" and "set" are used interchangeably in the specification to refer to objects that have been assigned to a particular category.

Once objects have been grouped together, the objects may undergo a pre-rendering scaling process (step 304) by the scaling component 202 in accordance with a scaling algorithm. The scaling algorithm can be based on any suitable parameter characterising the objects, such as size, price, quality, rating etc. When the scaling is performed based on the size of the objects, this provides object size perspective, whilst ensuring that a smallest object is at least visible on the interface. The scaling is such that a scaled size of a given object in a group is dependent on the size of the smallest and largest objects in a given category, and the scaling can be defined by any smoothly continuous function such as a linear or logarithmic function. As will be appreciated, scaling in this manner reduces or increases the size of a given object in relation to the largest and smallest object.

In an arrangement in which the scaling is performed on the basis of price, the objects in a given group (category) are scaled in relation to the objects having the highest and lowest associated prices. In this way, the objects are represented relative to the prices of the objects within the group as a whole: advantageously the relative sizes of the objects provide a visual and immediate indication of relative cost.

The packing component 203, at step 305, then identifies a plurality of portions, this being initially dependent on the number of categories. The packing component 203 can optimise the number of categories so as to balance the surface space requirement. For example, a given category such as washing machines may only comprise two objects but the surface space requirement may be similar to a further category such as office stationary that comprises twenty objects. As will be appreciated, the available space may be balanced between categories by applying the scaling algorithm 204 to the size of these portions, effectively making the portion sizes dependent on the number of objects assigned thereto. As will be appreciated, such balancing of the surface space balancing is an optional step.

Figure 5:
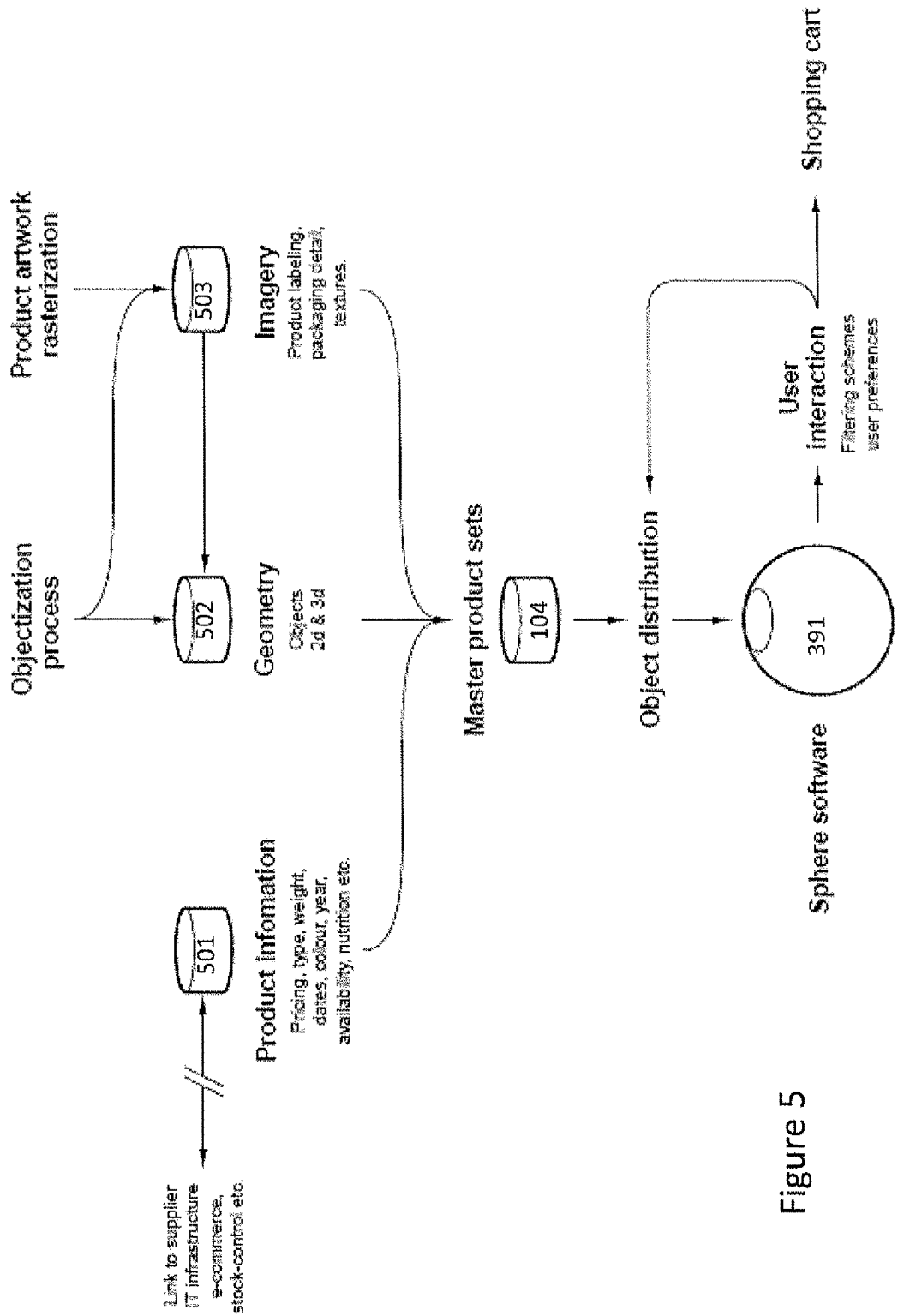
FIG. 5 shows a schematic diagram of data structures utilised to store data defining the objects rendered on the interface of FIG. 4.
Figure 6:
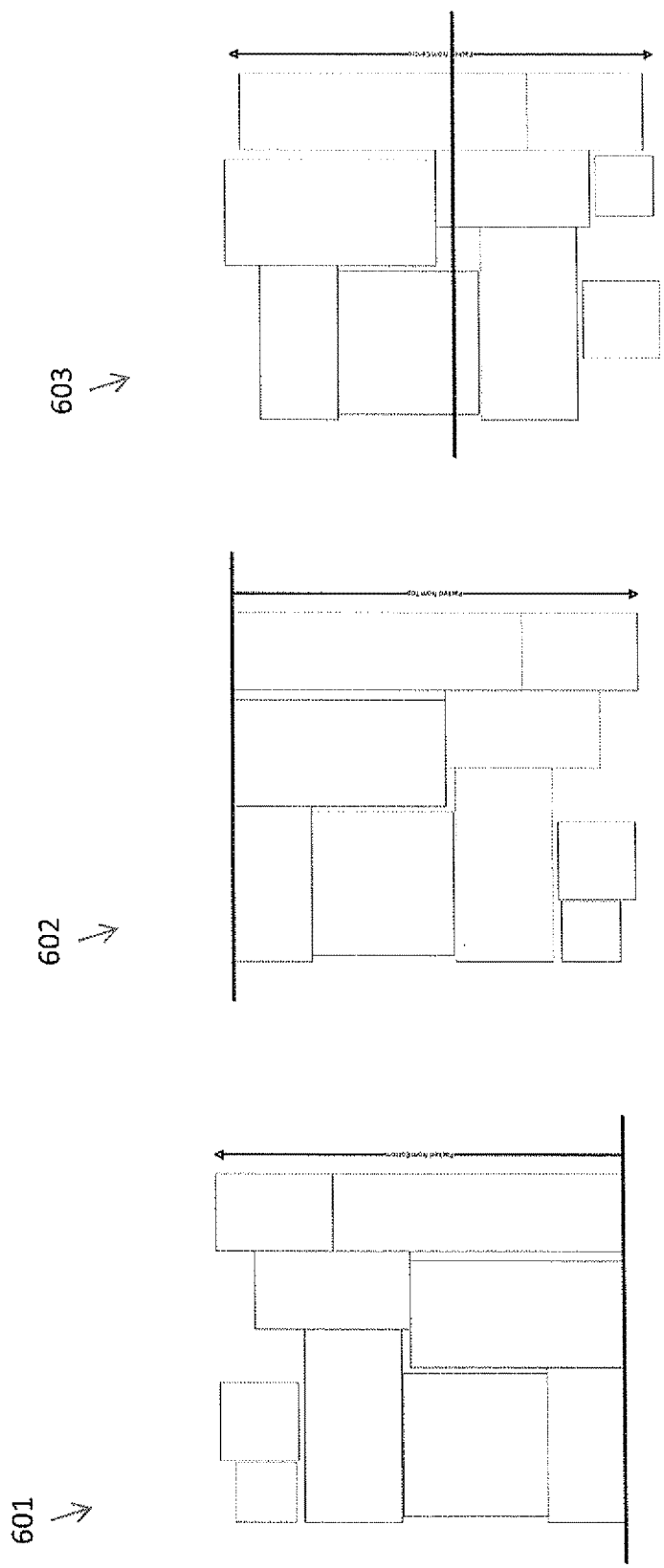
FIG. 6 shows mechanisms for packing objects in rectangular portions according to an embodiment of the invention.

The space requirement associated with each object, as regards its assigned portion, is dependent on how the object is represented, and the representations may be two-dimensional (e.g. text) or three-dimensional (e.g. products). Referring to FIG. 5, in one arrangement the database 104 that supplies object data to the client 102 and the server 103 organises object data in separate data structures, namely a product information data structure 501 (described above with reference to FIG. 2), a geometry data structure 502 and an imagery data structure 503. The geometry data structure 502 maintains the two-dimensional and three-dimensional geometry information relating to the set of objects, while the imagery data structure 503 stores images in relation to the set of objects, such as labels, packaging, etc. The geometry data structure 502 may also include information relating to positioning constraints associated with the objects: for example, rotation of a given object representation may be prohibited, e.g. to ensure the front of a cereal box is always presented, and this information can be stored in the form of a recommended orientation for the object. An objectification process, e.g. performed as part of an offline process, combines the object geometry and the object imagery to create the representations of the objects that can then be utilised by the packing component 203 to pack each of the objects optimally within a given portion.

On the basis of the geometry data structure 503, the packing component 203 may identify bounding polygons for each of the objects—bounding polygons are convenient because the objects to be positioned may be of varying shapes that may be very different from one another, e.g. a fork is shaped quite differently to a coffee pot. The bounding polygones are effectively a region that fully encloses a given object, and in a preferred arrangement the bounding polygon is two-dimensional. As is well known in the art, packing algorithms pack objects in as small a volume as possible, whilst avoiding overlap between objects. Thus, and to avoid overlap, the packing component 203 utilises a predetermined separation distance between the bounding polygones within a given portion; the separation distance can also be applied at the boundaries of neighbouring portions to ensure that the objects placed on the corner of a given portion are not too close or overlap an object of a given neighbouring portion.

The packing component 203 can apply a variety of heuristics to pack the objects; these heuristics range from a naive packing component, which simply places each object into the container in their sorted order, to an exhaustive search algorithm, which is guaranteed to find the solution requiring the least space at the expense of high computation complexity. To limit the resources required by packing process, the packing component 203 may opt for less computensive heuristics. Examples include the well known packing heuristics such as "one column", "two column" and "sort and fit". The skilled person will appreciate that selection of an appropriate heuristic will be dependent on the resources available to whichever device (102, 103) executes the packing component 203.

The packing component 203 packs objects grouped in the manner described above in a portion, herein referred to alternatively as a container, which has defined dimensions. Instead of using an arbitrary value for the container's dimension for the packing process, the packing component 203 may fix at least one dimension of the container, such as the width. Examples of the output of the packing component 203 for a container of fixed width are shown in FIG. 7: a container of fixed width can be packed top-down, whereby a first object is placed on the top of the container and subsequent objects are placed under the first object, as shown in a packed arrangement 602. Alternatively, the packing component 203 may utilise a bottom-up 2-D bin packing algorithm, the output of which is shown as arrangement 601. The packing component 203 may alternatively utilise a centre-outwards 2-D bin packing algorithm, where the first object is placed in the centre of the container and subsequent objects are placed above and below the first object, as shown in arrangement 603. When the objects relate to products available for selection and purchase, for any given category of products, those that a merchant wishes to highlight can be placed in the centre of the three-dimensional surface by tagging objects appropriately and using the centre-outwards packing mechanism (such as is depicted by arrangement 603), and then positioning remaining objects according to the ordering of objects within the group. In addition, the packing component 203 may define regions in a given portion that are reserved for highlighted objects.

For any given container, an exemplary, non-limiting example of the steps executed by the packing component 203 when utilising the top-down two-column packing algorithm are as follows:

1) Determine any objects having a width greater than half the width of the container, and position, in no particular order, these objects at the top of the container, such that the objects are positioned to be viewable in the same plane;
2) Divide the remaining space of the container into two parts, namely first and second parts, such that any object positioned in the first and the second part is also viewable in the plane of the objects that were wider than half the width of the container: in a preferred embodiment the two parts are equally sized, but the parts could be of different sizes for example, if a significant number of the objects in the category have a width greater than half the container size;
3) Order the remaining objects in the descending order of their heights;
4) Create a notional first region in the first part by positioning the tallest remaining object, the height of this first region being defined by the height of the tallest object;
5) Position the next remaining tallest object in the notional first region adjacent the tallest object, and repeat this step until the notional first region cannot accommodate any more objects;
6) Create a notional second region in the second part by placing a next remaining object in the second part, and place as many objects as possible in the notional second region;
7) Compare the filled heights of the first part and the second part, and create a further notional region in whichever of the first and second part has lesser filled height by placing the next remaining object in the order;
8) Place as many objects as possible in the further notional region on the basis of the order; and
9) Repeat steps 8 and 9 until all the objects in the subset have been placed or the portion cannot accommodate any more objects.

Thus, according to this packing process, the packing component 203 determines the sum of dimensions of the grouped objects and compares the determined dimension with the corresponding dimension of the relevant container. For example, the packing component 203 compares the combined height of the objects of the given group and compares it with the height of the container to which the objects have been grouped. In the event that the sum of the dimensions of some of the objects assigned to the group is greater than the dimension of the container, the packing component 203 only positions a selection of objects of the within the container, namely those whose sum of the dimensions is not greater than the dimension of the container.

In an alternative embodiment, the packing algorithm 203 utilises the 2-D bin-packing centre-out approach and the container is unbounded in at least the vertical dimension. As a result all of the objects within a group can be accommodated within the container to which they have been assigned, but the user may be required to scroll up or down to view the objects which "spill" over the top or bottom.

The packing component 203 may order the objects assigned to a group using a strictness criterion. The strictness criterion ranges from 0% to 100% (0-1), and the higher the value of the strictness criterion, the more strictly the ordering criterion is applied to the grouped objects. For instance, if the strictness criterion is zero then the packing component 203 would pack the objects as optimally as possible without any regard to ordering based, for example on characteristics such as weight, price etc. of the objects. On the other hand if the strictness criterion is 100% for a specified characteristic, then the packing component 203 organises the objects in the group according to that characteristic before packing the objects, and the strictness enforces organisation of the objects onto the packing component 203. When objects within a given group are ordered according to two or more characteristics, the strictness criterion can be applied in respect of one, some, or all of the characteristics.

An example of packing when applying a strictness criterion of 100% to an ordering based on price, and applying a 2-D bin-packing bottom-up approach, will now be described with reference to FIGS. 7a-7z. In this example, the packing component 203 organises the objects in a group assigned to cleaning products on the basis of price, for which the strictness criterion has been set to 100%; where objects are within the same price bracket (band), the objects within a given price bracket are ordered according to object height. When the strictness criterion has been set to 0%, all objects will be ordered according to object height, and no other characteristics will be taken into consideration. For a value somewhere in between 0% and 100%, objects will be approximately ordered in price brackets, and by height within those bands, so as to make the best use of the space available.

In this example, it is assumed that all of the objects fit within one half of the container, so that step 1) of the algorithm described above does not apply. The packing component 203 then performs the following steps to determine a position for the objects in the cleaning group, when ordering of the objects within the group is to be performed on the basis of price:
1) Determine an ordering bracket, which is utilised to order objects in accordance with the strictness and price:

OrderingBracket=(1−StrictnessCriterion)*(Ordering Parameter$_{Max}$−Ordering Parameter$_{Min}$)

Figure 7A:
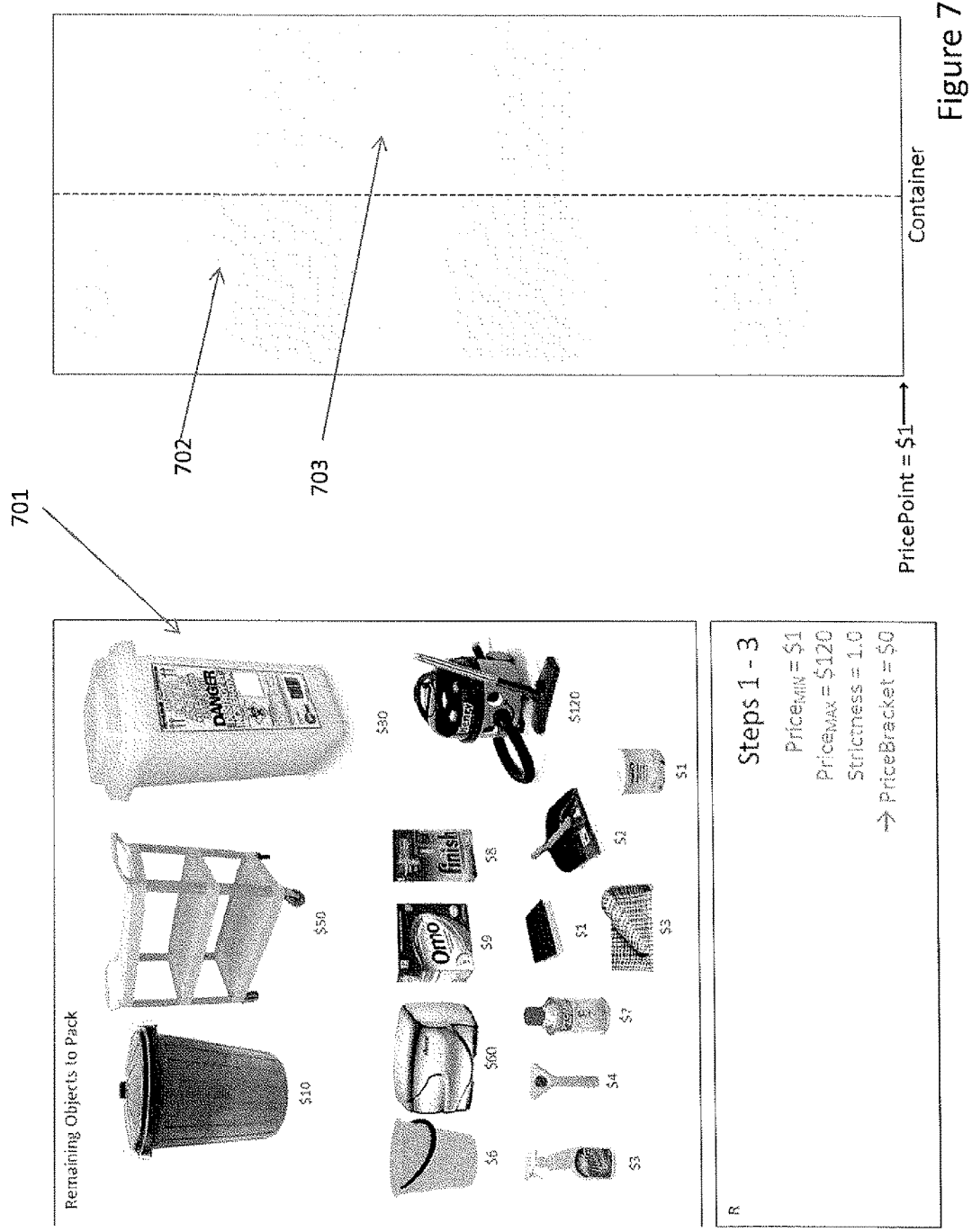
FIG. 7a-FIG. 7z show an example of packing objects in a given portion according to an embodiment of the invention.
Figure 7B:
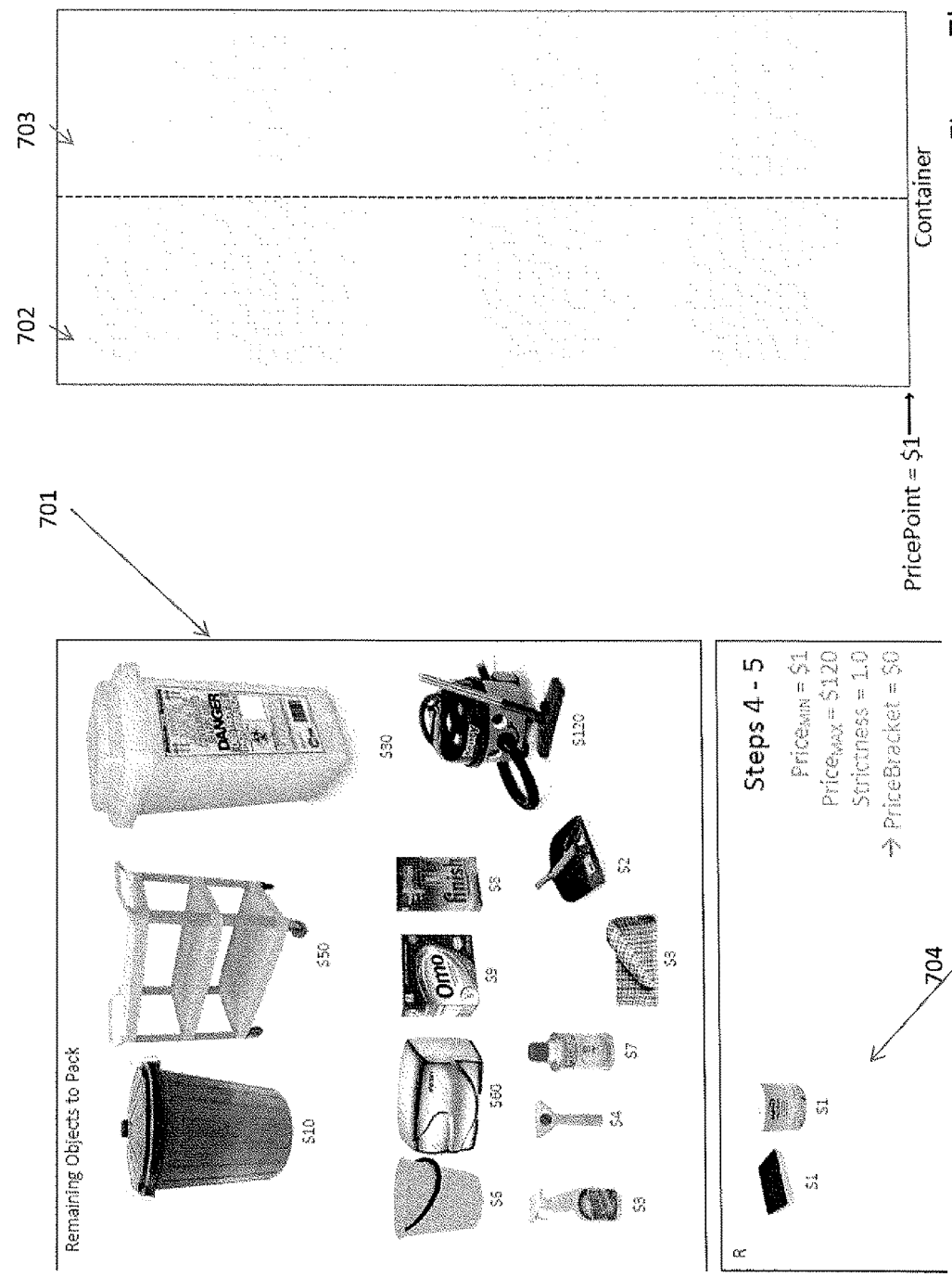
Figure 7C:
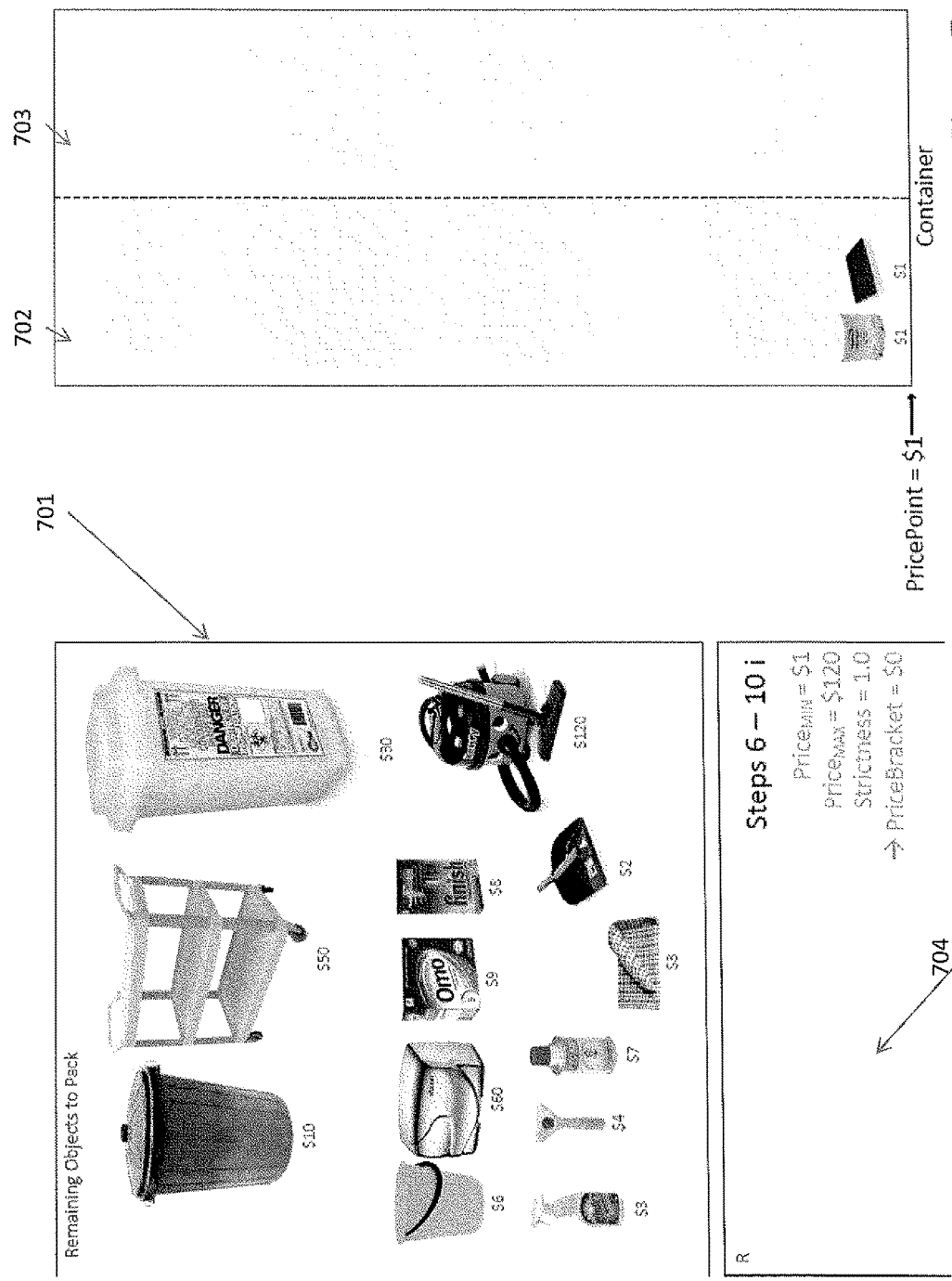
Figure 7D:
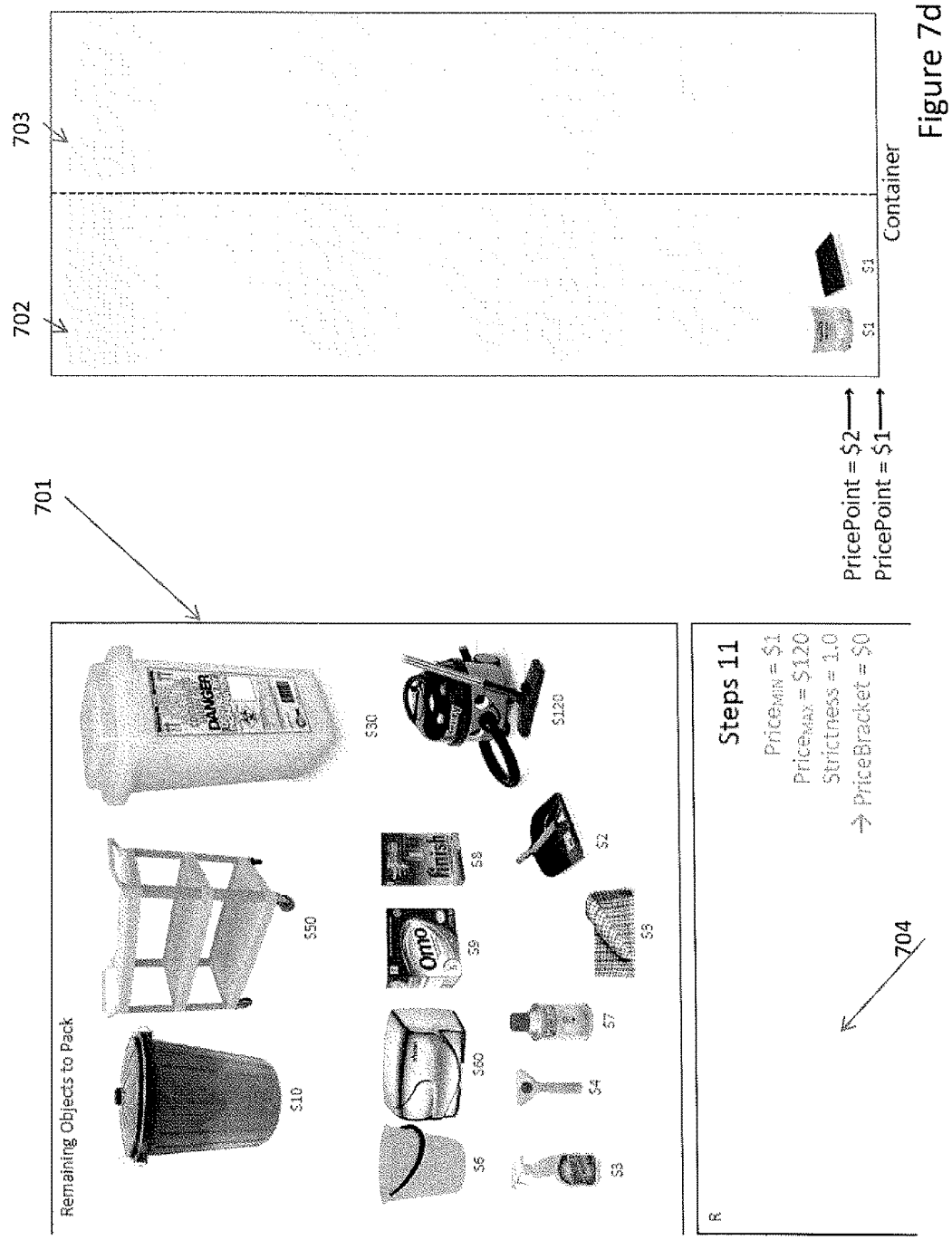
Figure 7E:
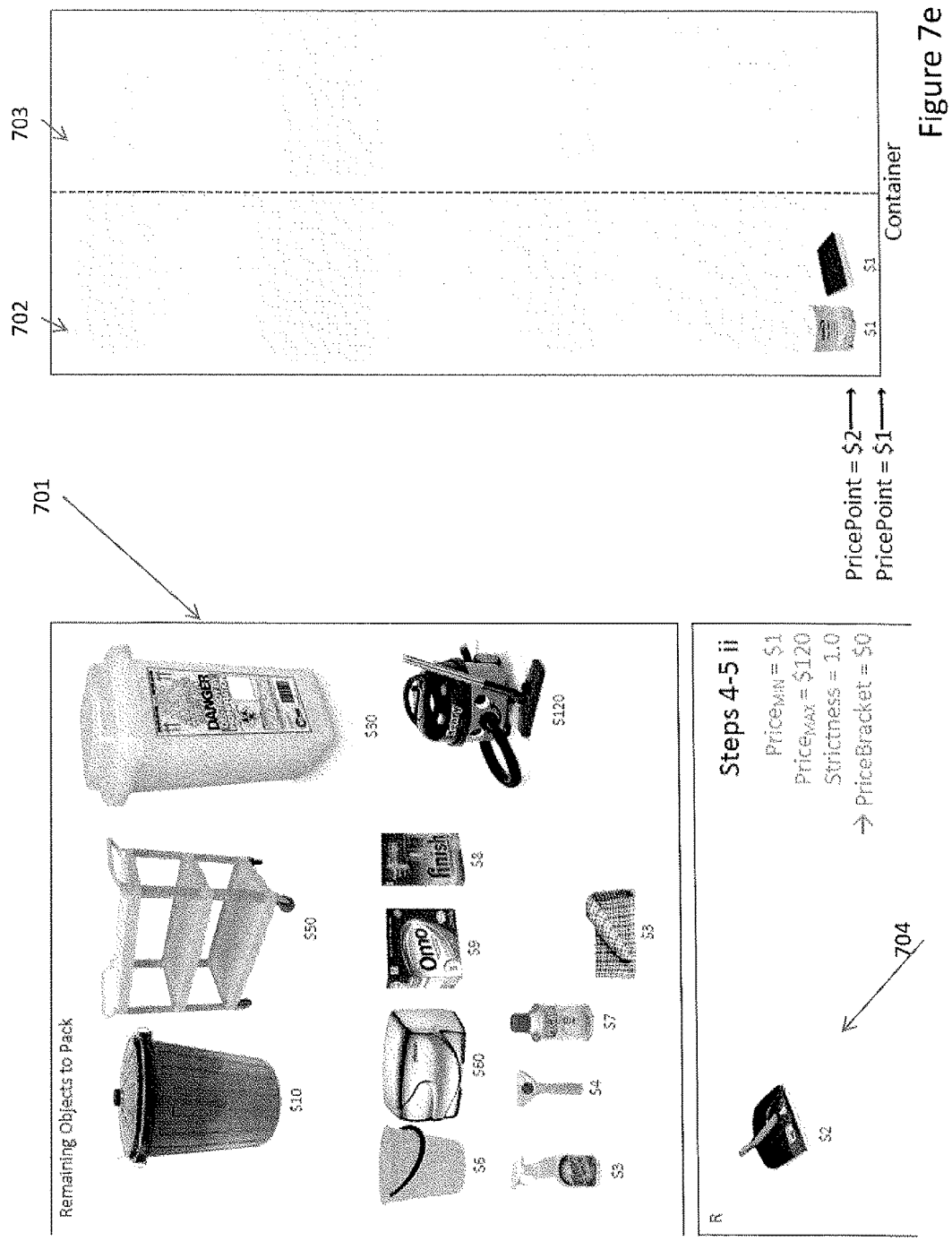
Figure 7F:
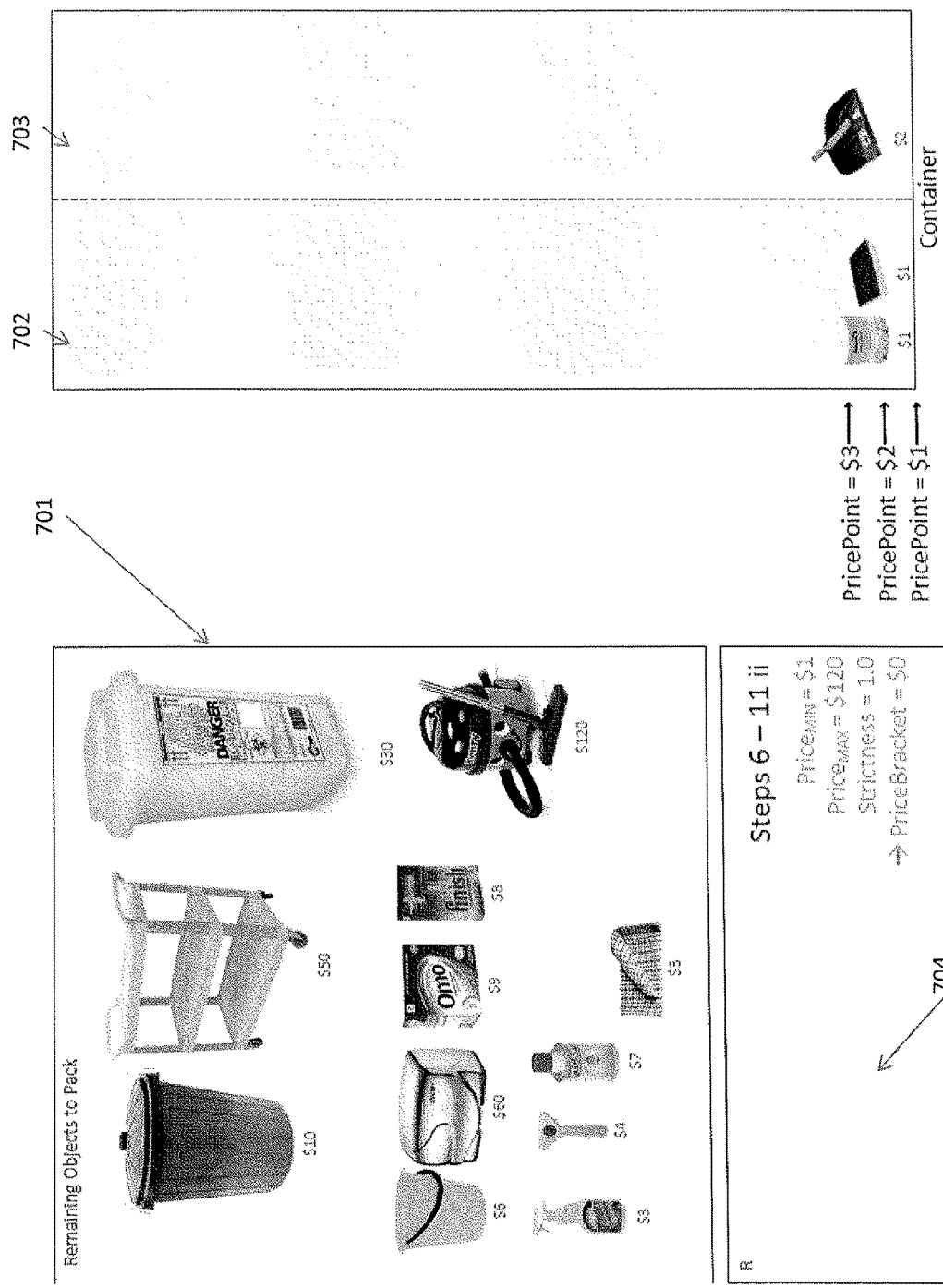

As shown in the example of FIG. 7a, a price bracket, or the ordering bracket, for a group of objects 701 is determined is as follows:

PriceBracket=(1−StrictnessCriterion)*(Price$_{Max}$−Price$_{Min}$)=(1−1)*(120−1)=0;

2) Divide a given portion, or container, into two equal sized parts, namely a first part and a second part, thus, in the example, the packing component 203 divides the container into a first part 702 and a second part 703;
3) Set a first ordering point, which is utilised to identify objects that that can be placed in a first iteration, as:

OrderingPoint=Ordering$_{Min}$, which is "$1" in the example per FIG. 7a;
4) Determine objects that can be placed in the first iteration by identifying objects in the cleaning group for which:

ObjectOrderingCriterion≤(OrderingPoint+OrderingBracket), thus, as per example in FIG. 7b, the packing component 203 determines objects 704 whose price is less than or equal to the sum of the price point and the price bracket, which is satisfied by the toilet tissue and cleaning pad in this example;
5) Order the two objects determined at step 4) on the basis of height;
6) Depending on space availability, a notional region (not shown) is created in the first part 702 or the second part 703; in the first instance (i.e. first iteration), the notional first region may be created in the first part 702. The height of the notional first region is set by the height of the tallest object matching this price point; referring to FIG. 7a, the tallest object in this price bracket is a toilet tissue roll. Thus this object is placed first in the first part 702 in a notional first region;

7) In the event that there are objects selected at step 4) remaining to be positioned, for each remaining object: assess the width of the next tallest object against the width remaining in the notional first region; if its width is greater than the remaining space in the notional first region, this/these object(s) are positioned within the first part by creating a further notional region within the first part 702. For the present example, this part of the algorithm applies as follows:
   a. the next tallest object is also the only remaining object in this price bracket (the cleaning pad); since the notional first region can also accommodate the cleaning pad, it is placed adjacent the toilet tissue roll;
   b. since no objects remain that are in the "$1" bracket, move onto step 8);
8) In the event that there are objects remaining in the "$1" bracket, compare the filled heights of the first part 702 and the second part 703, and place the remaining object(s) in one of the parts depending on which part has the greatest amount of available space to position the objects; since no objects remain that are in the "$1" bracket, this step is not applicable in this iteration;
9) Repeat steps 7-9 until there are no remaining objects in the "$1" bracket;
10) Set the ordering point as follows:

$$\text{OrderingPoint}_{new} = \text{OrderingPoint}_{Previous} + \text{Ordering-Bracket} + 1,$$

which is "$2" in the next iteration (to be described below); and

11) Repeat steps 4-11 until all the objects in the group are positioned

In the second iteration, triggered at step 11) described above, the packing component 203 identifies objects in the cleaning group that have a price less than or equal to "$2". Of the remaining objects in the subset 701, only one object, namely a dustpan, satisfies this price criterion. The packing component 203 compares the filled heights of the first part and the second parts. Since the filled height of the second part 703 is smaller than that of the first part 702, the dustpan is placed in the second part 703.

Figure 7G:
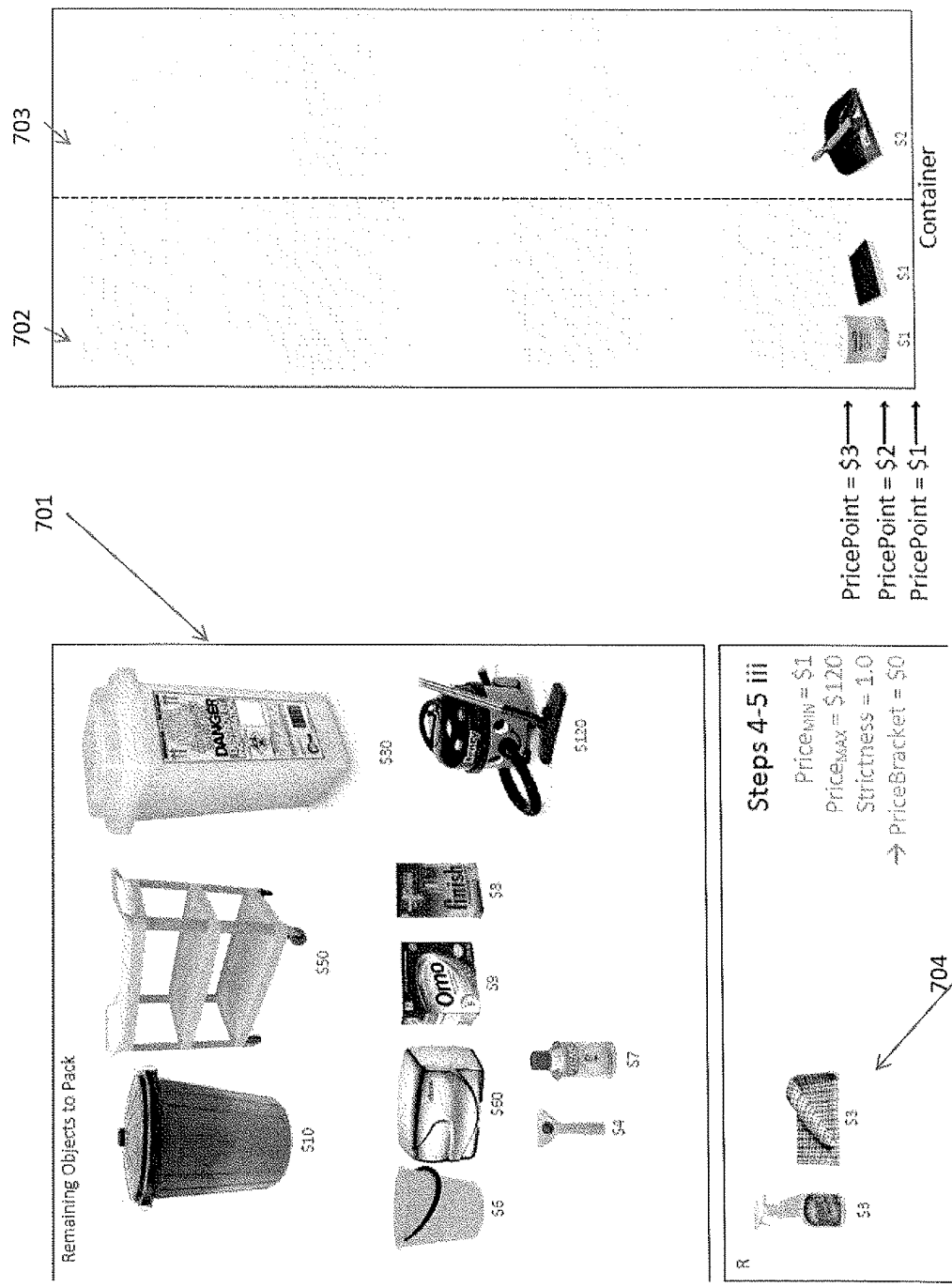
Figure 7H:
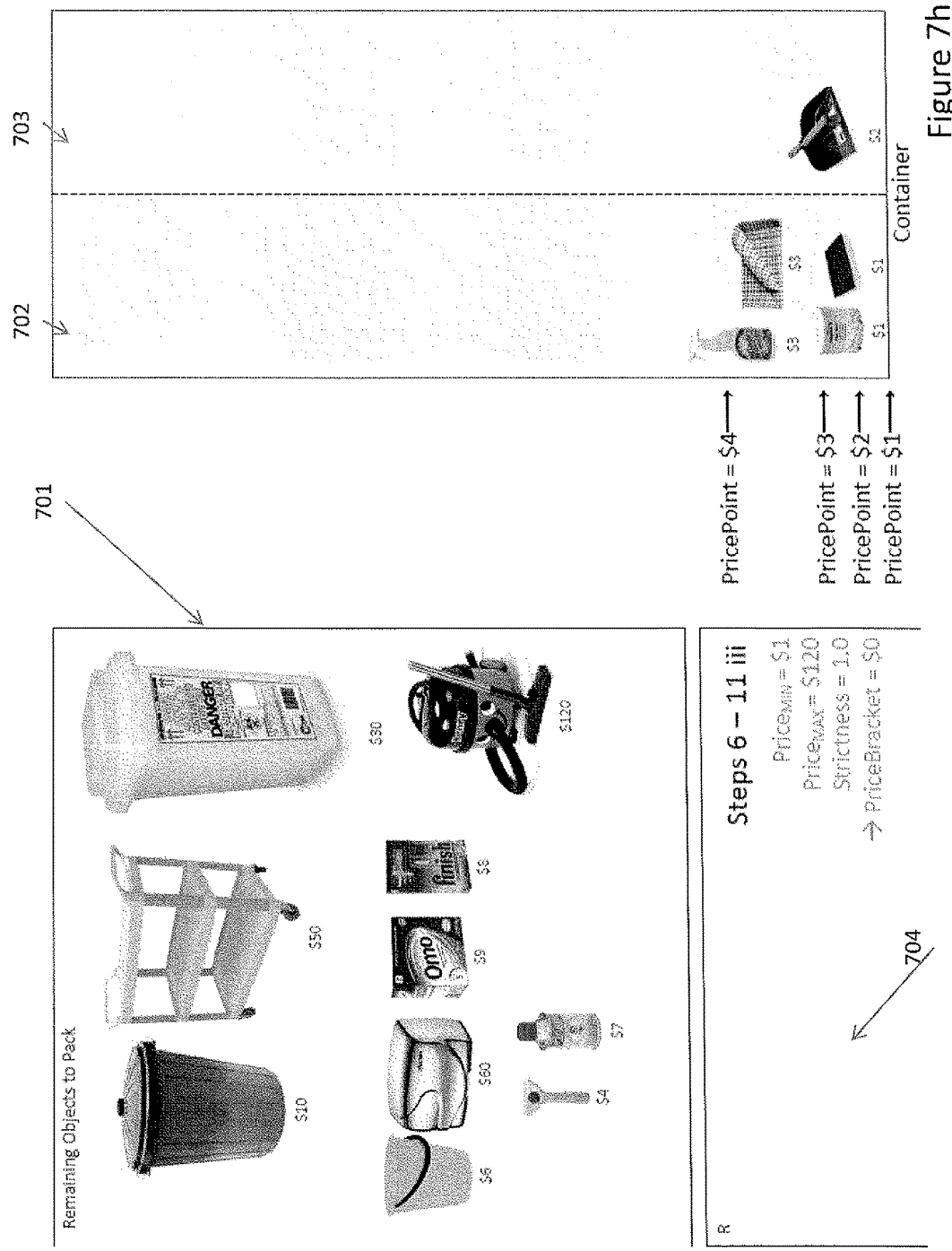
Figure 7I:
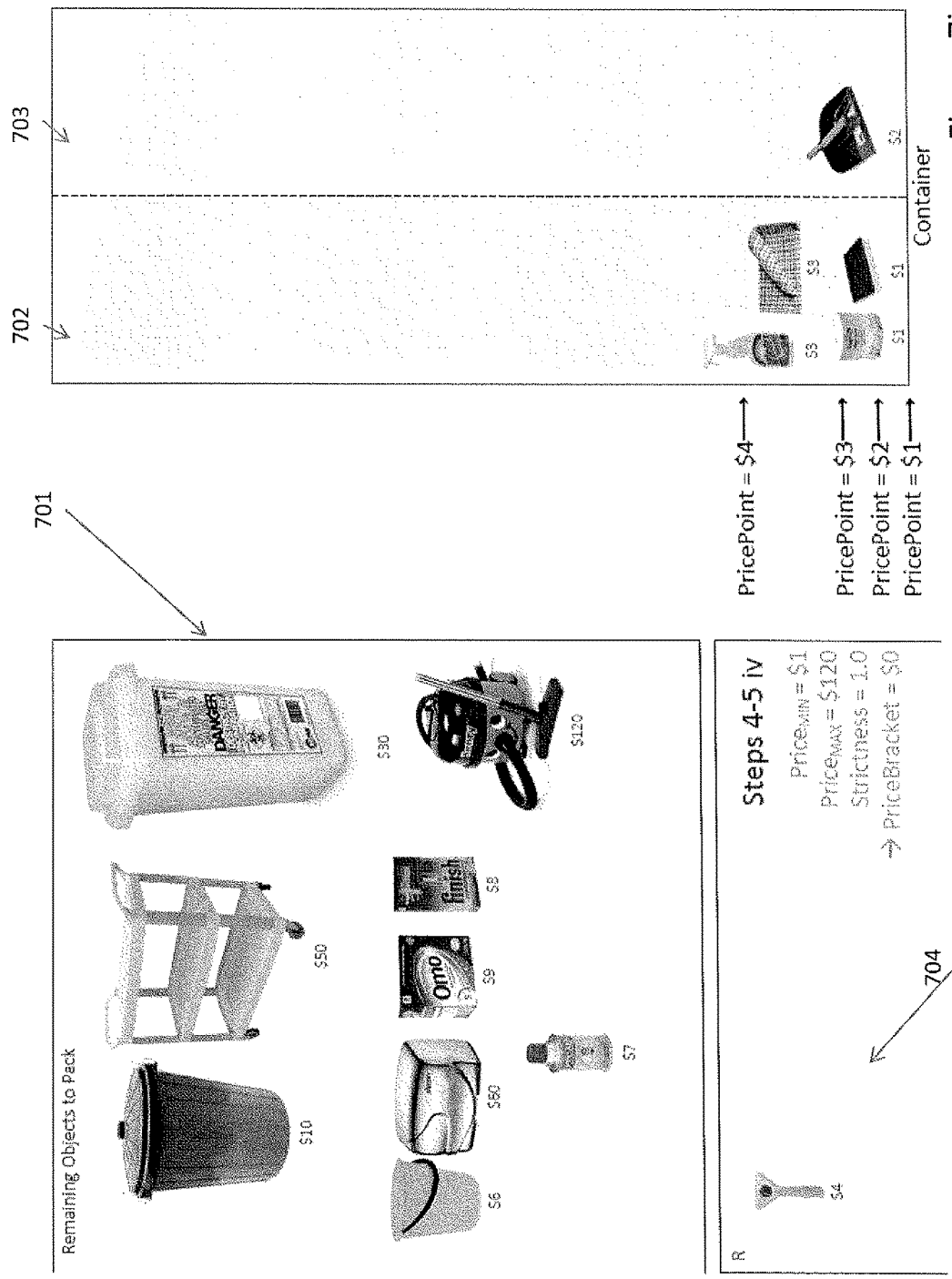
Figure 7J:
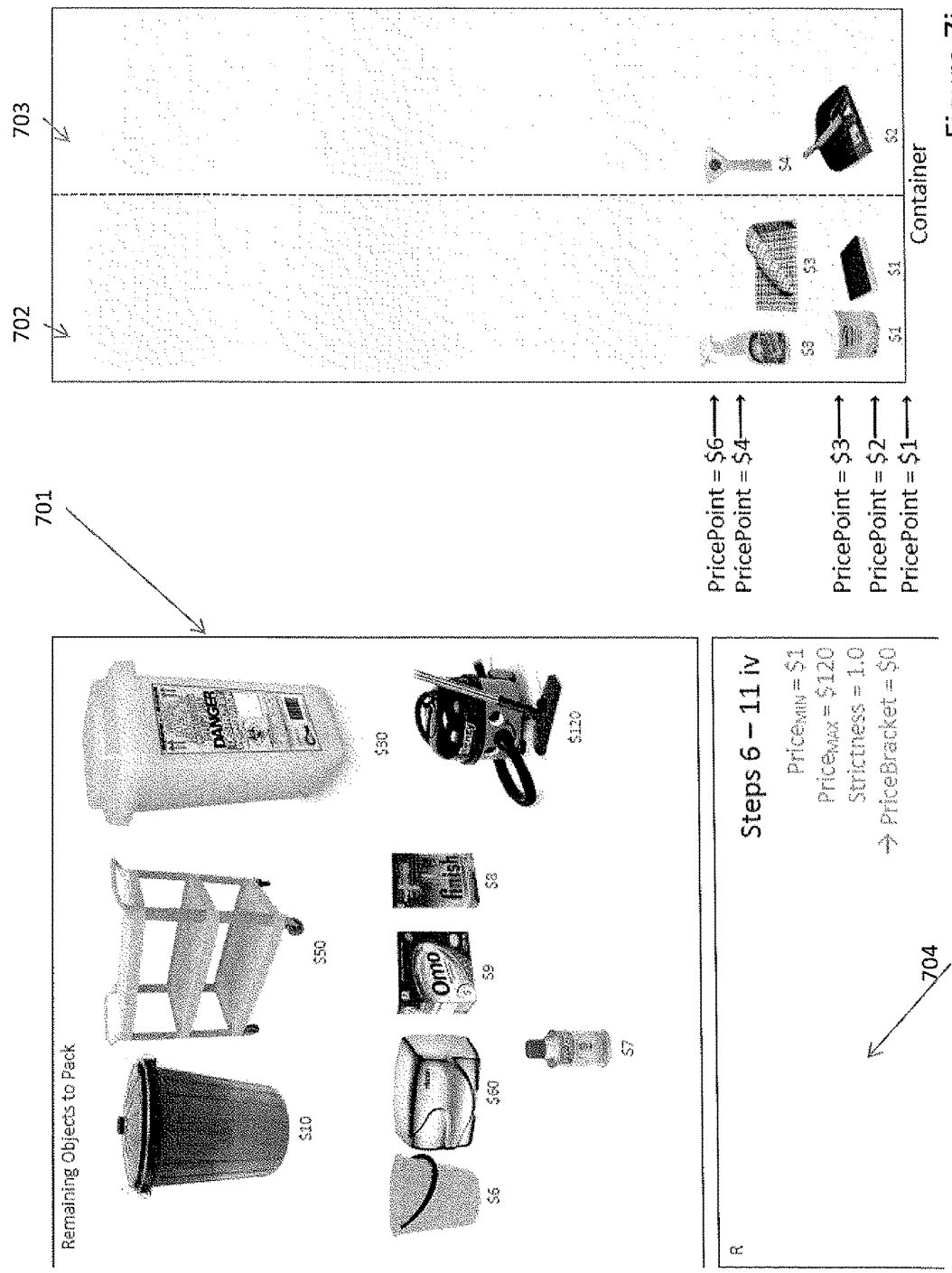
Figure 7K:
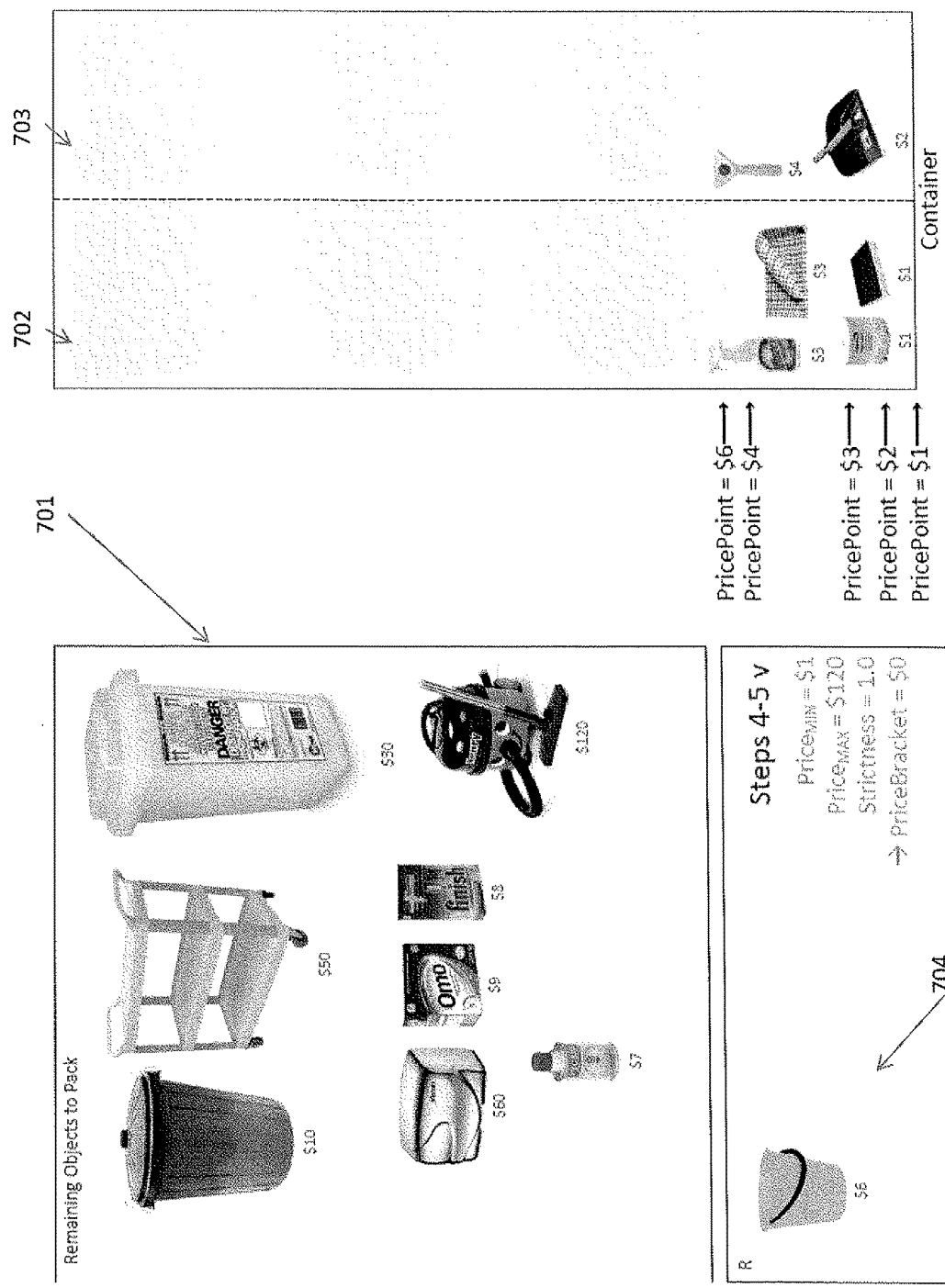
Figure 7I:
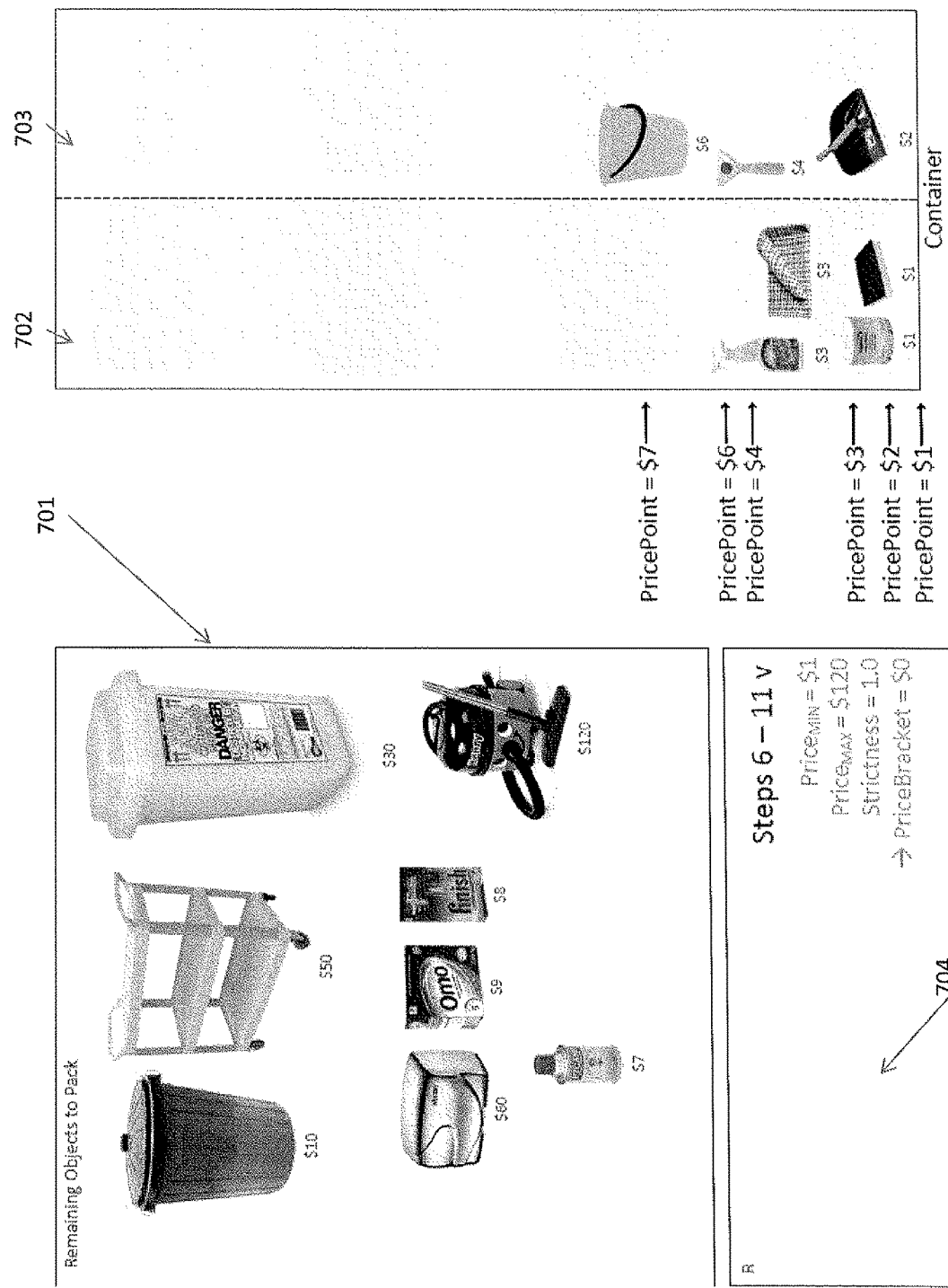
Figure 7M:
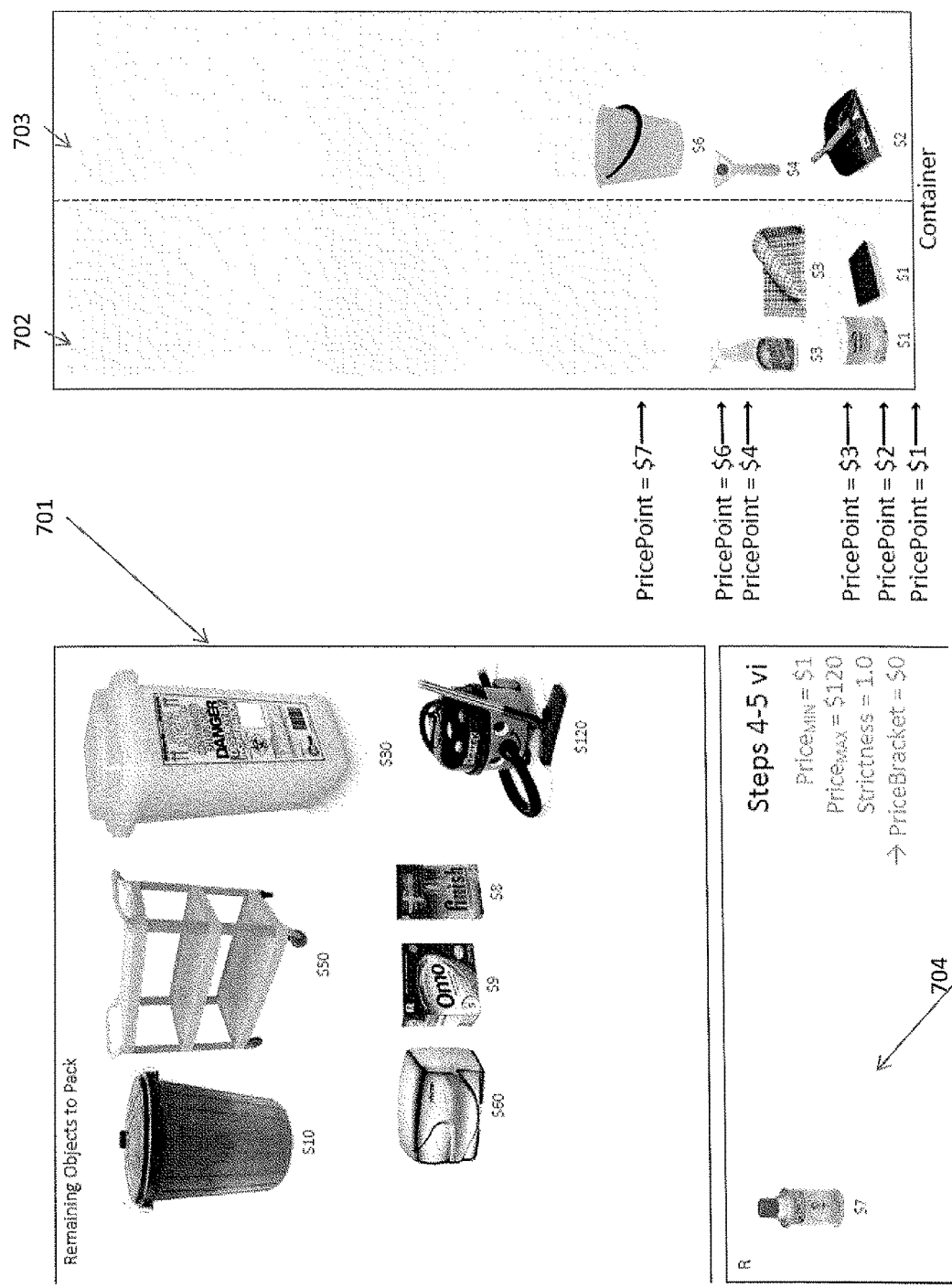
Figure 7N:
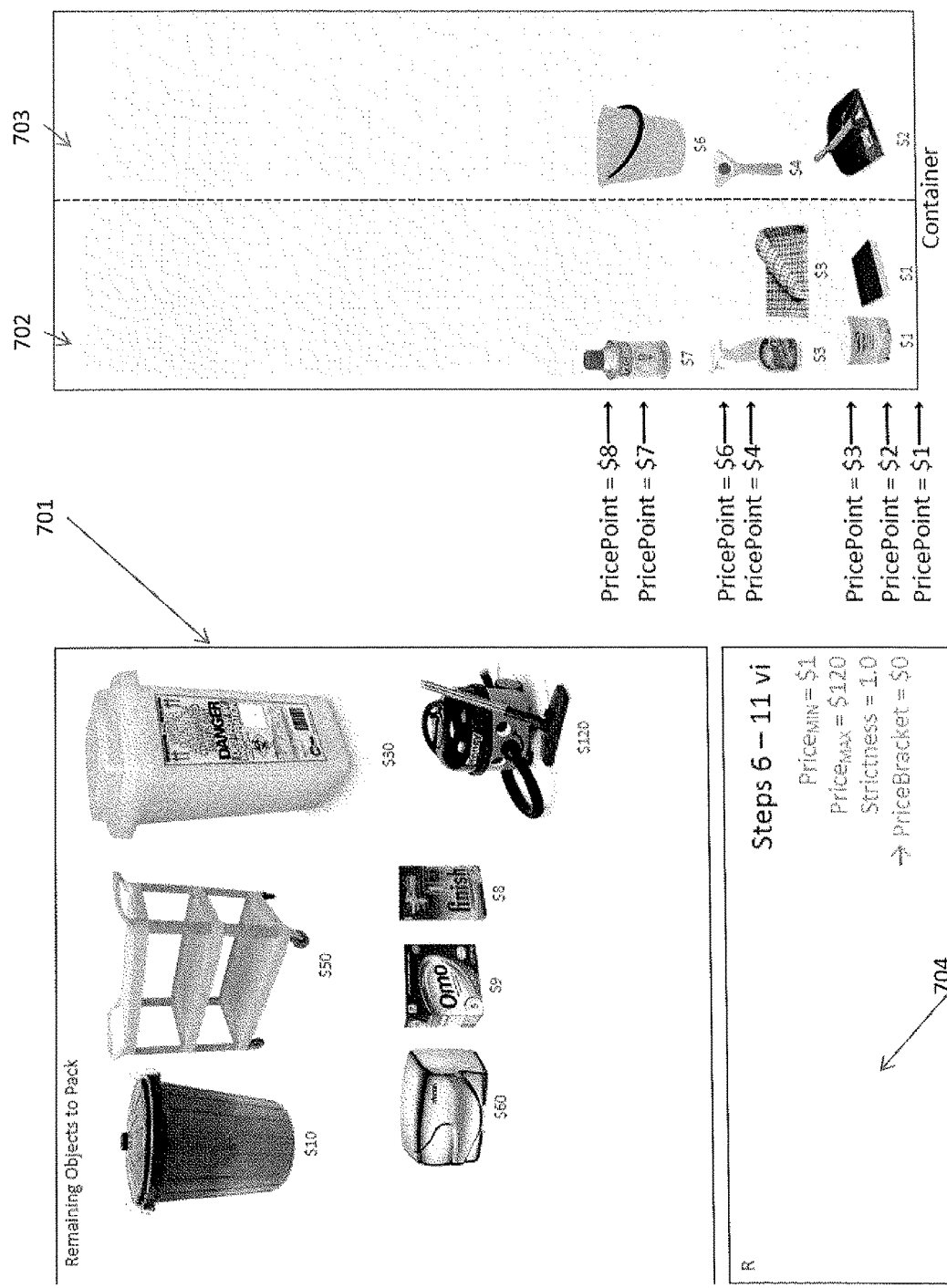
Figure 7O:
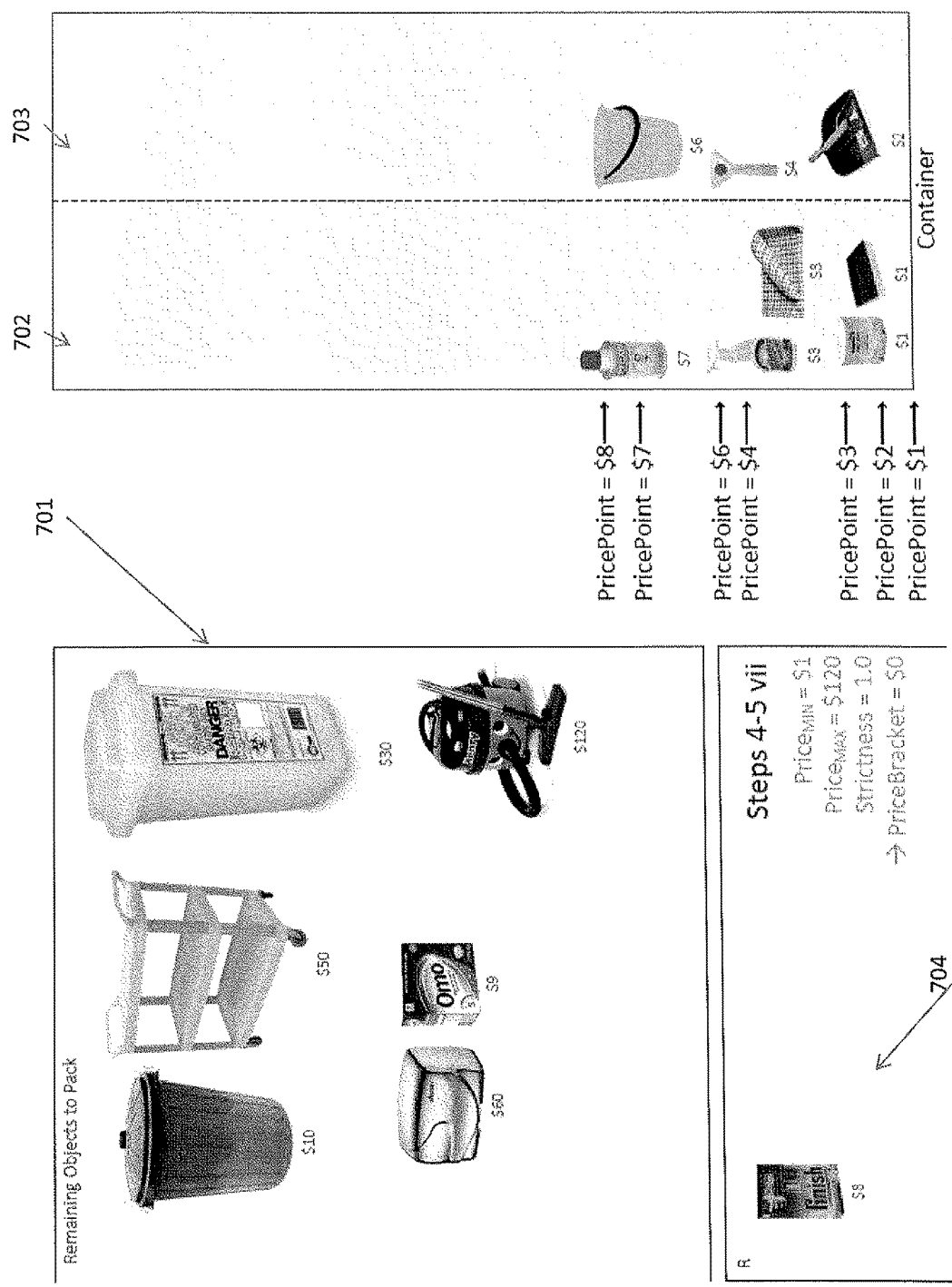
Figure 7P:
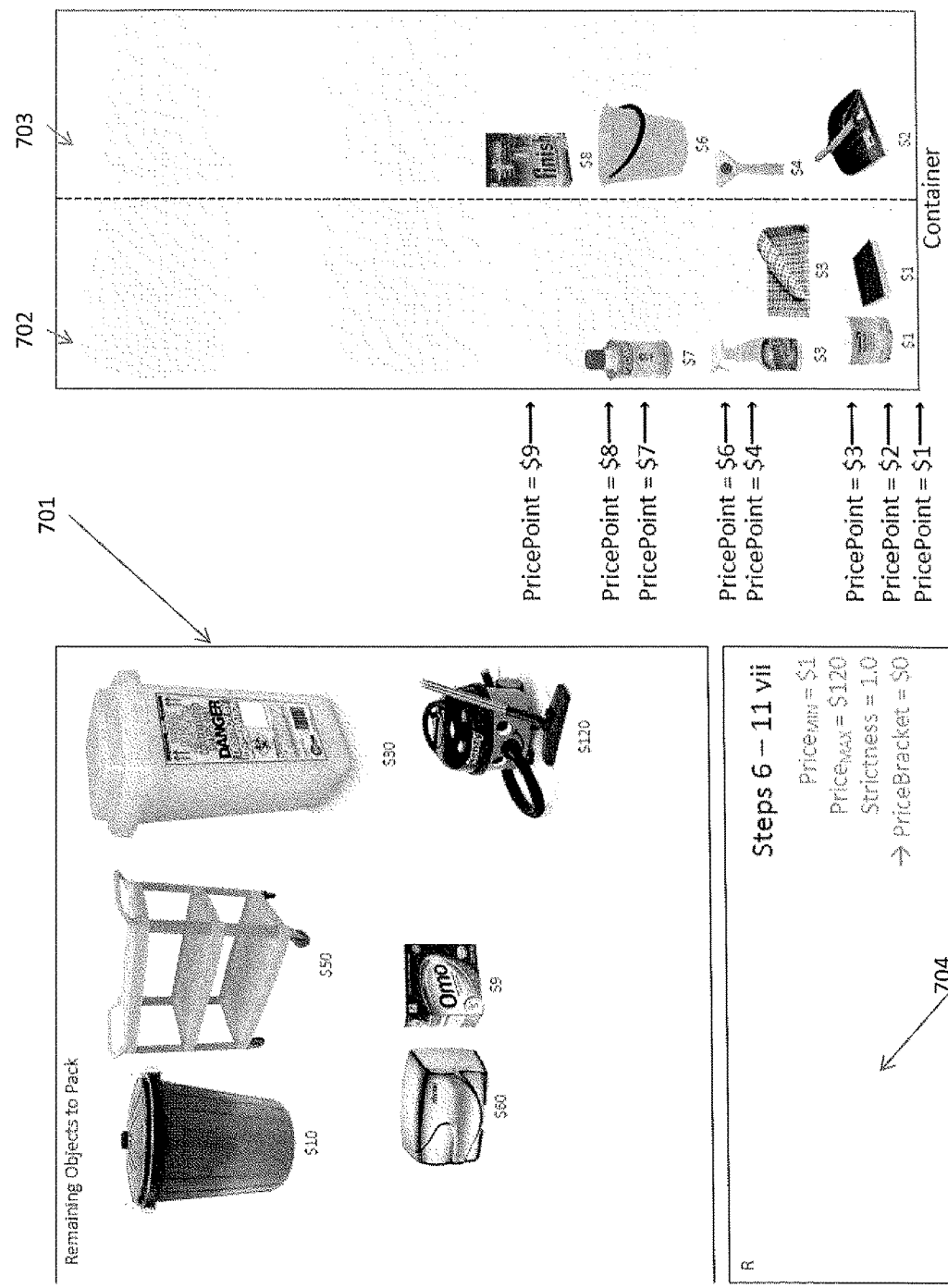
Figure 7Q:
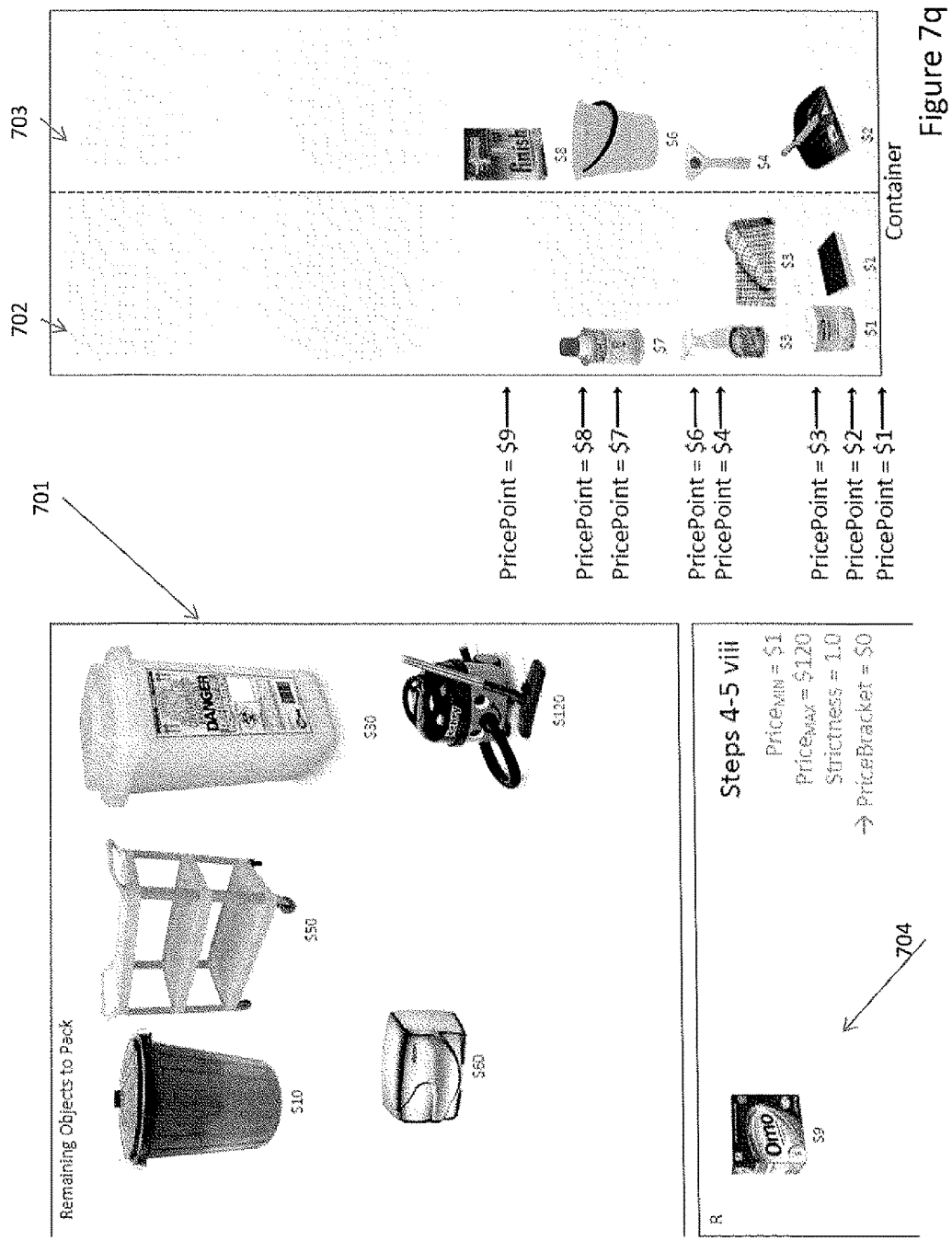
Figure 7R:
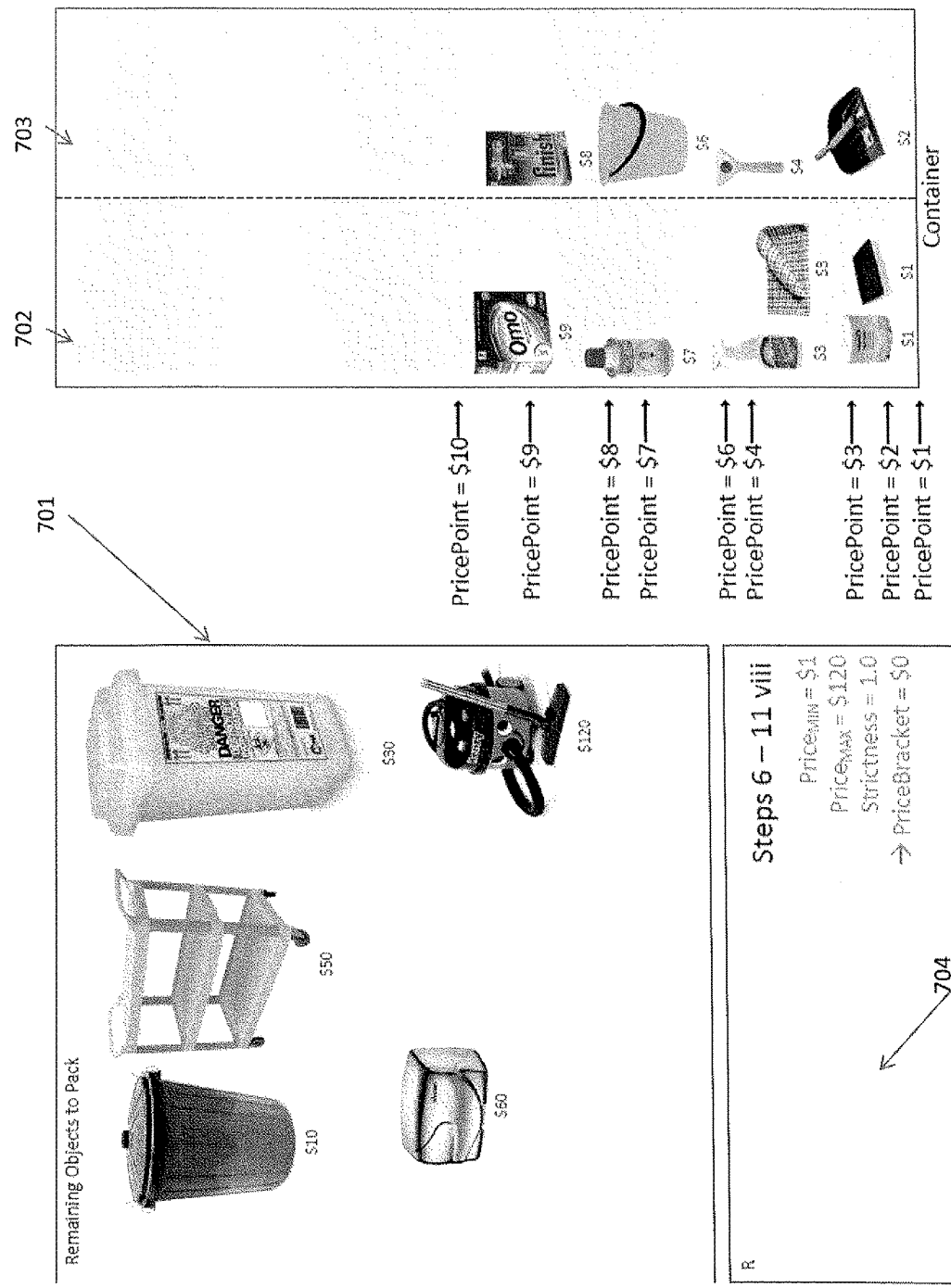
Figure 7S:
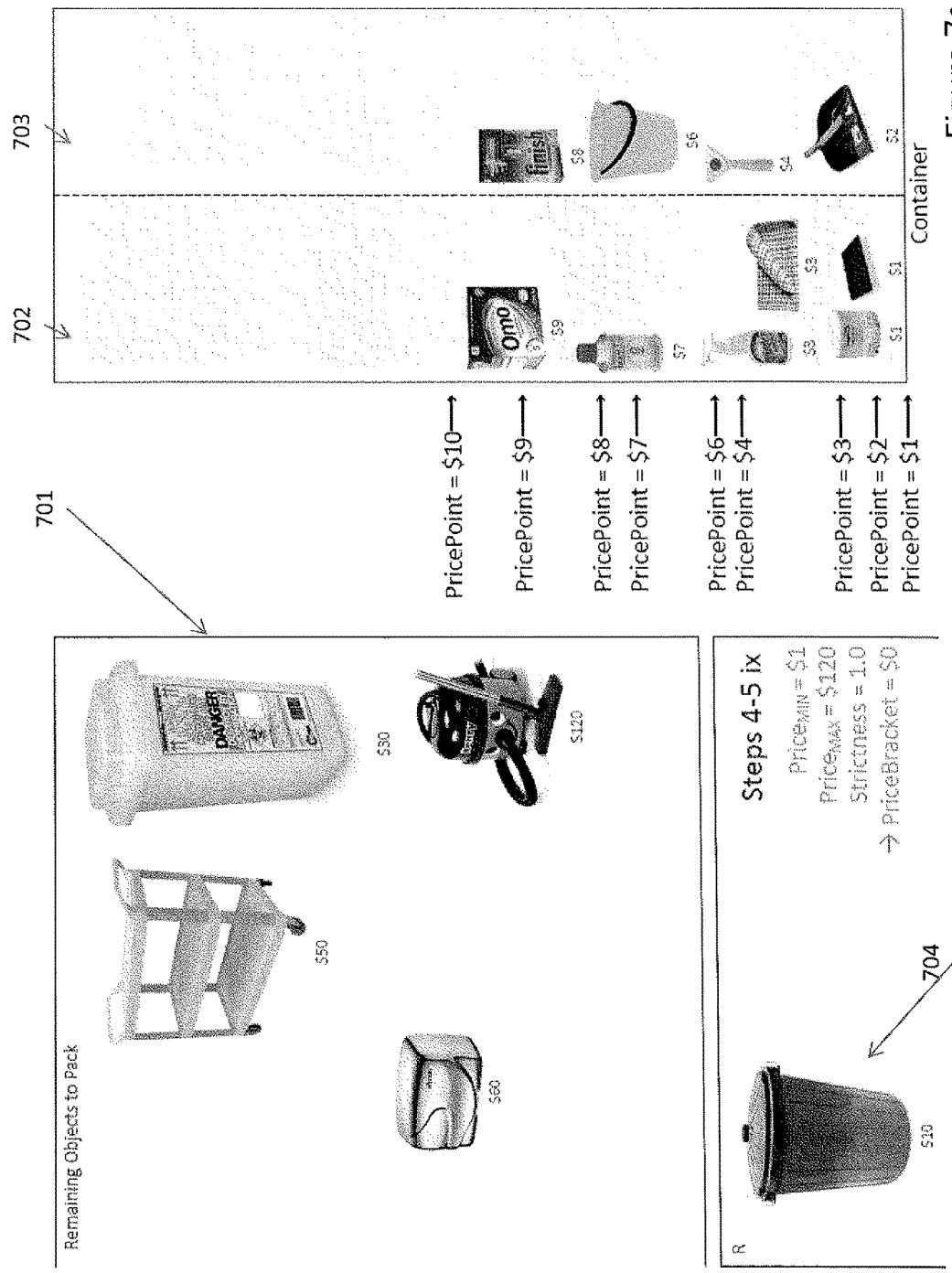
Figure 7T:
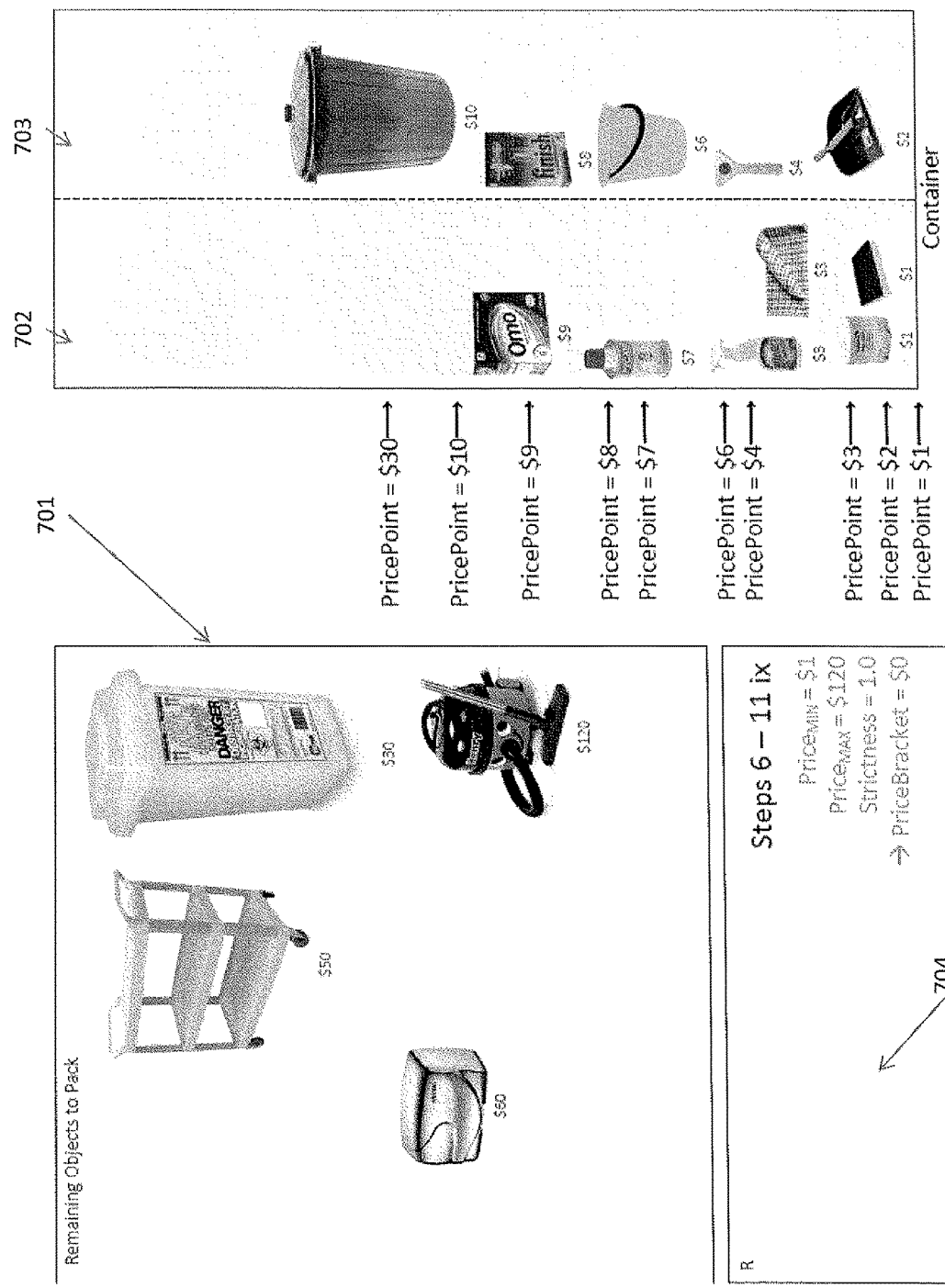
Figure 7U:
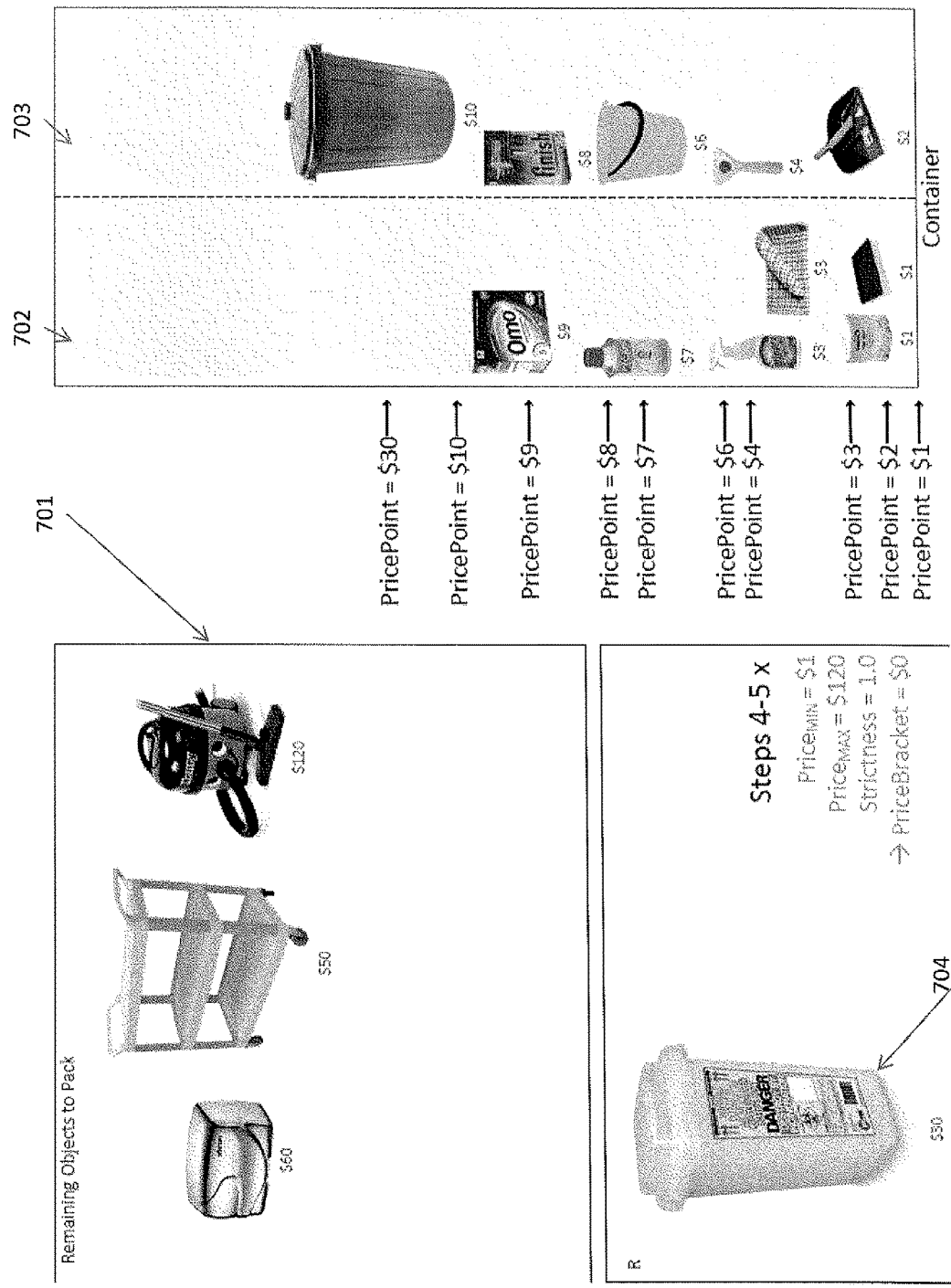
Figure 7V:
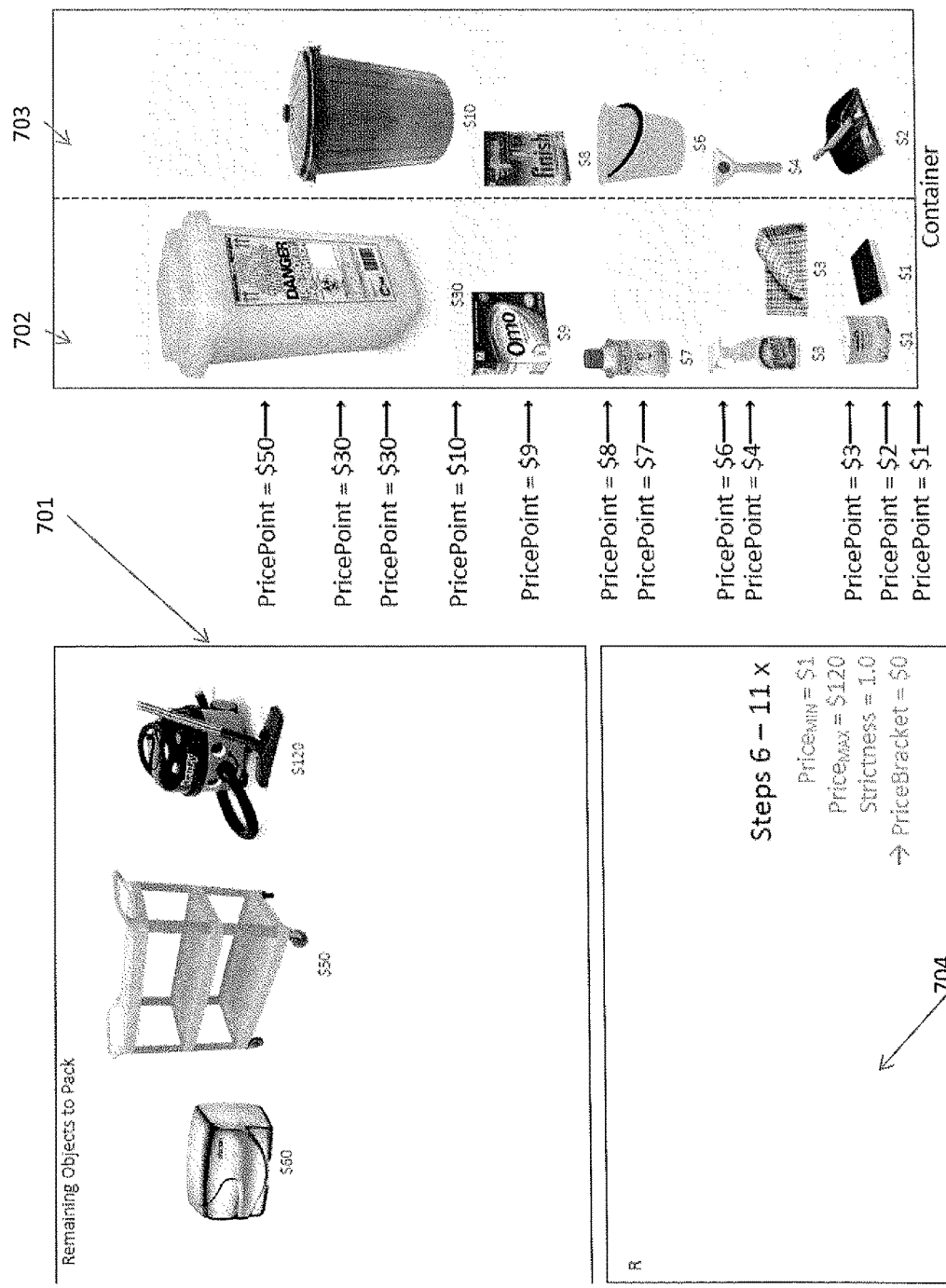
Figure 7W:
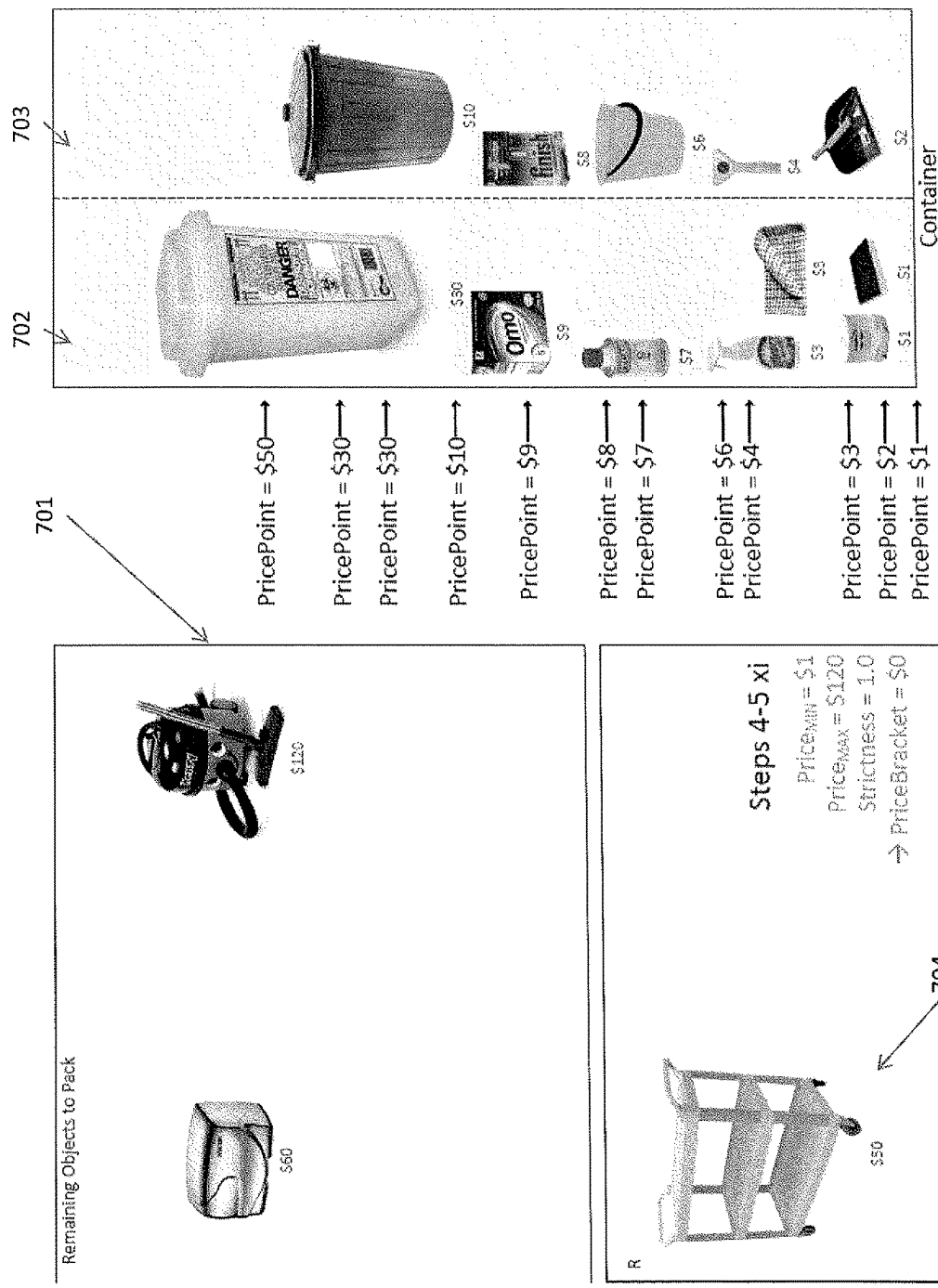
Figure 7X:
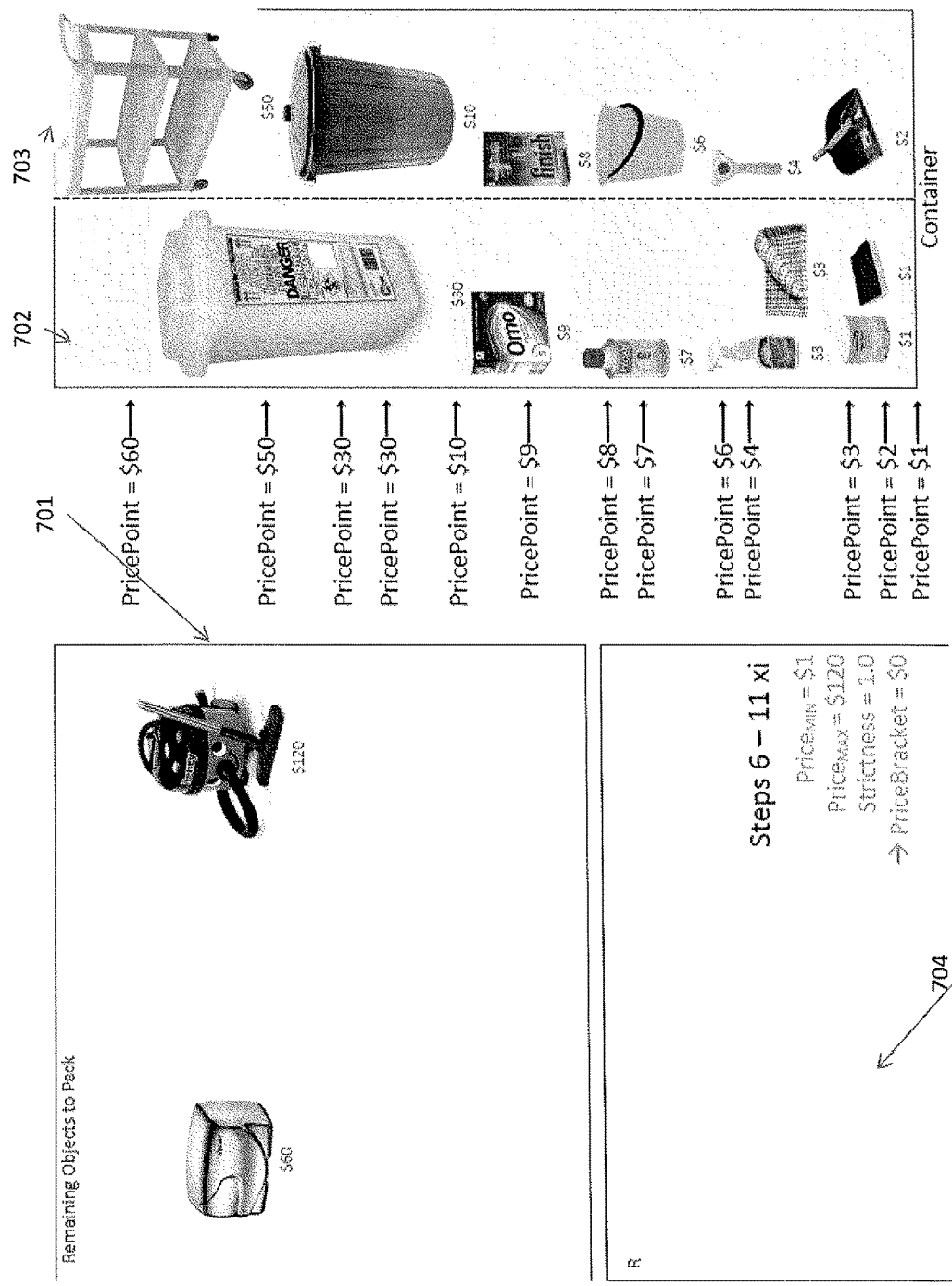
Figure 7Y:
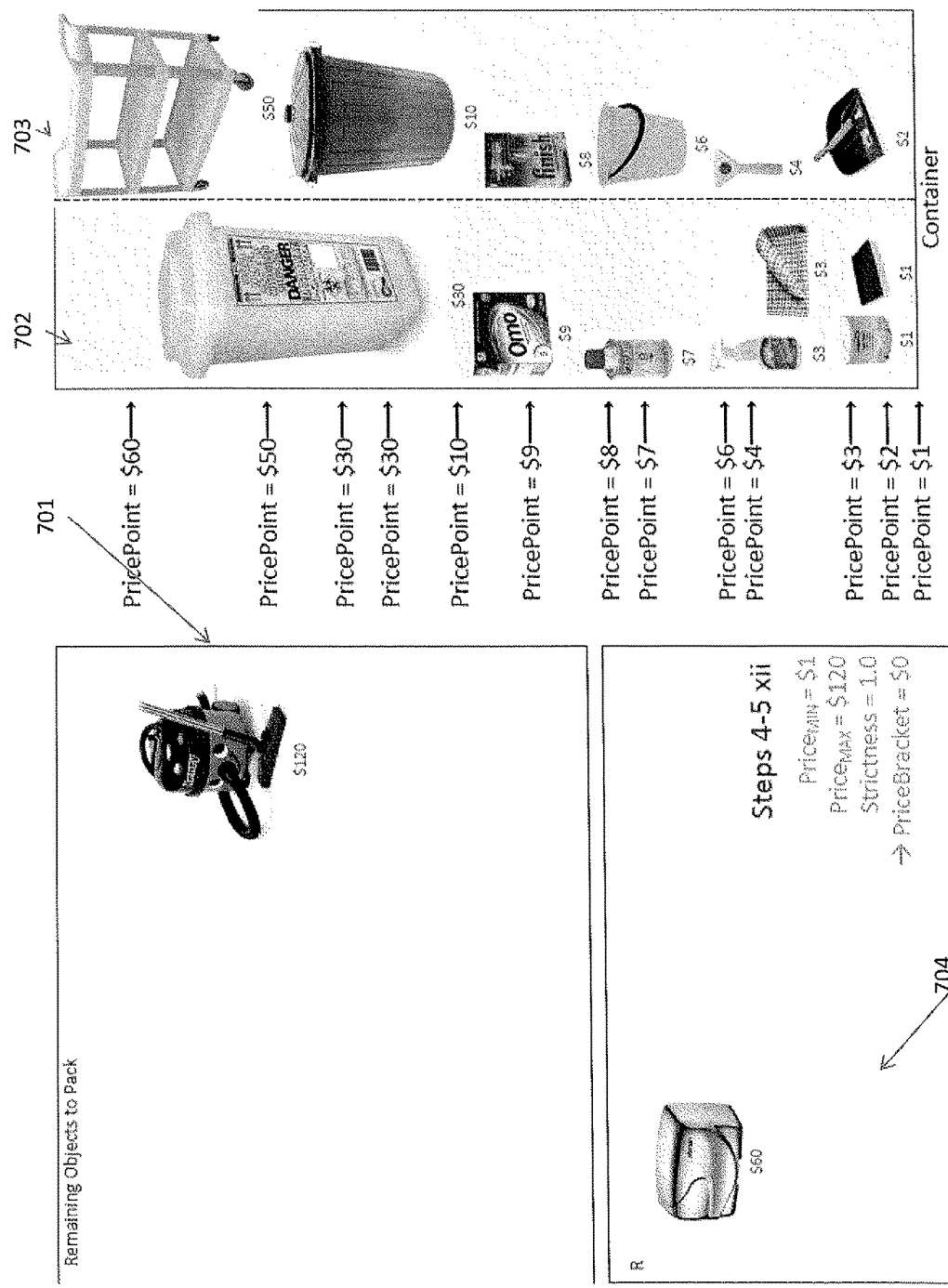
Figure 7Z:
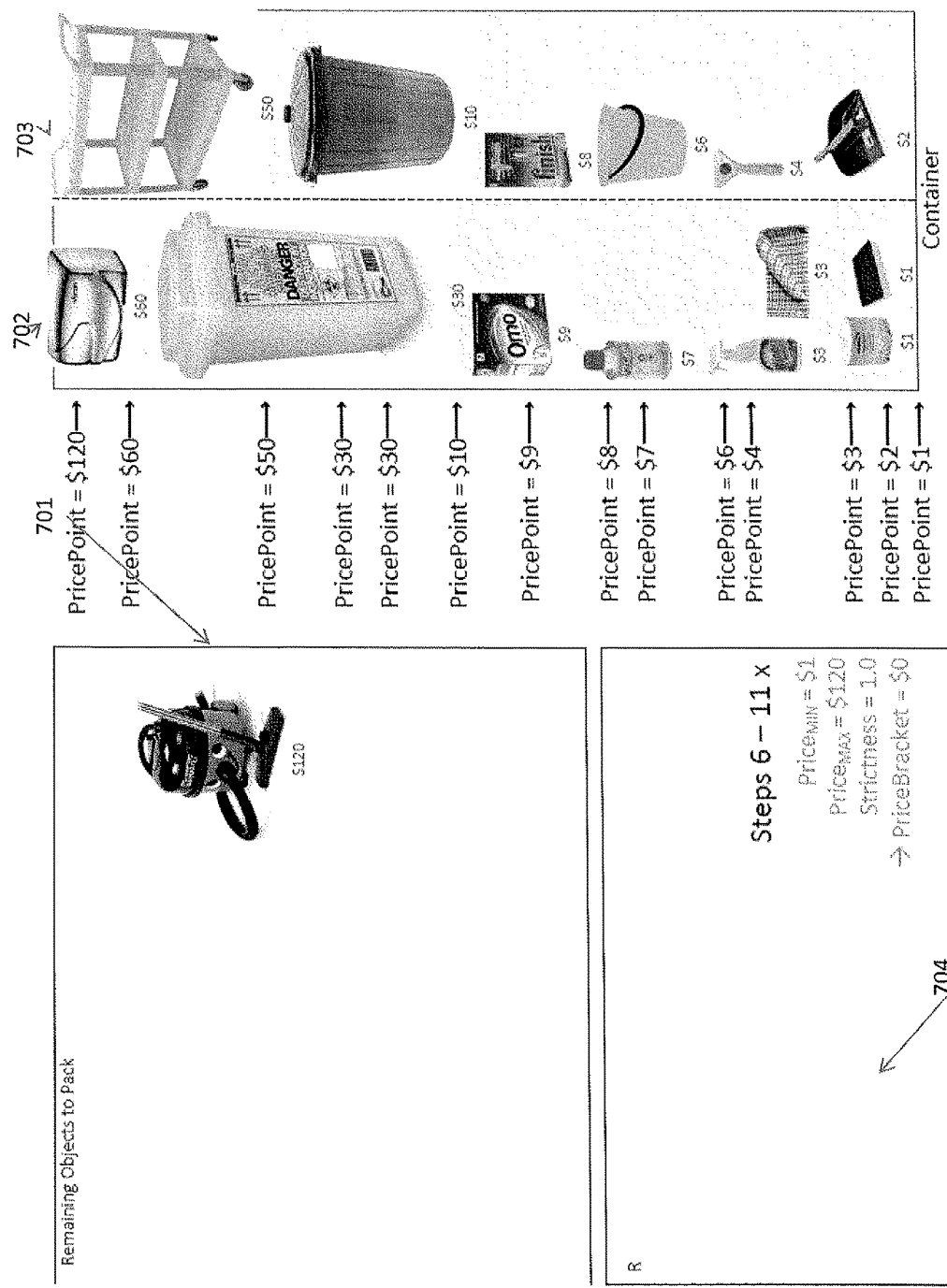

Since there are no more objects remaining in the group relating to price bracket '$2', the packing component 203 determines the next price point, which is determined to be '$3', and identifies objects satisfying this criterion, namely a spray and a cloth, as can be seen in FIG. 7g. The packing component again compares the filled space height of the first part 702 and the second part 703, and in this case, the filled space height of the first part 702 is determined to be smaller than that of the second part 703. As a result the packing component 203 positions these objects within the first part 702 as can be seen in FIG. 7h. The packing component 203 continues to position the remaining objects of the subset 701 in the first part 702 for the various price points ($4, $6, $7, $8, $9, $10, $30, $50, $60) and populates the container with objects as shown in successive FIGS. 7i-7z. While in the examples shown in FIGS. 7a-7z the object characteristic to which the strictness criterion has been applied is price, it will be appreciated that the strictness criterion could be applied in respect of any characteristic, be it extrinsic or intrinsic, that is used to order objects within a group.

Figure 8A:
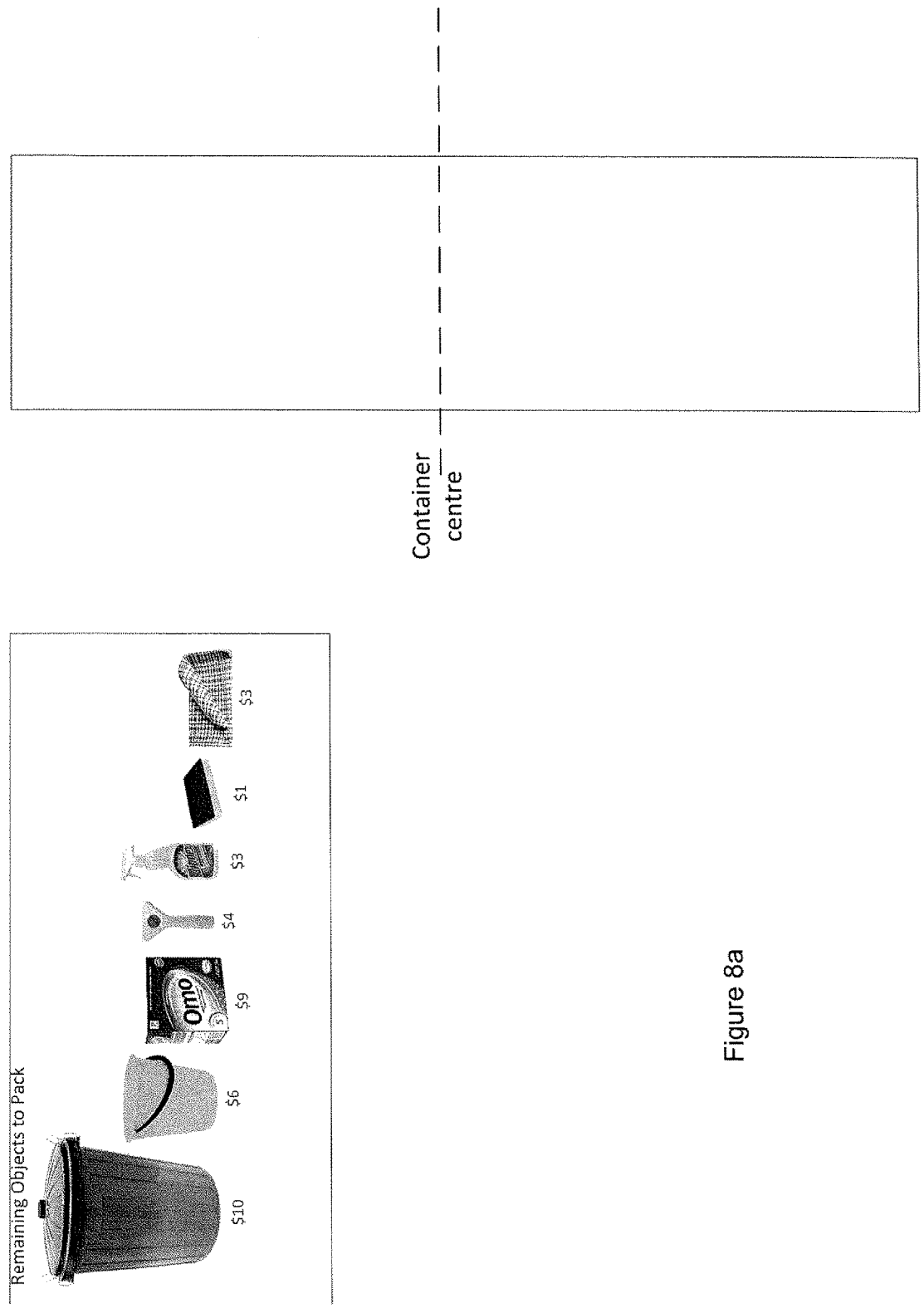
FIG. 8a-FIG. 8c show an example of packing objects in a given portion according to another embodiment of the invention.
Figure 8B:
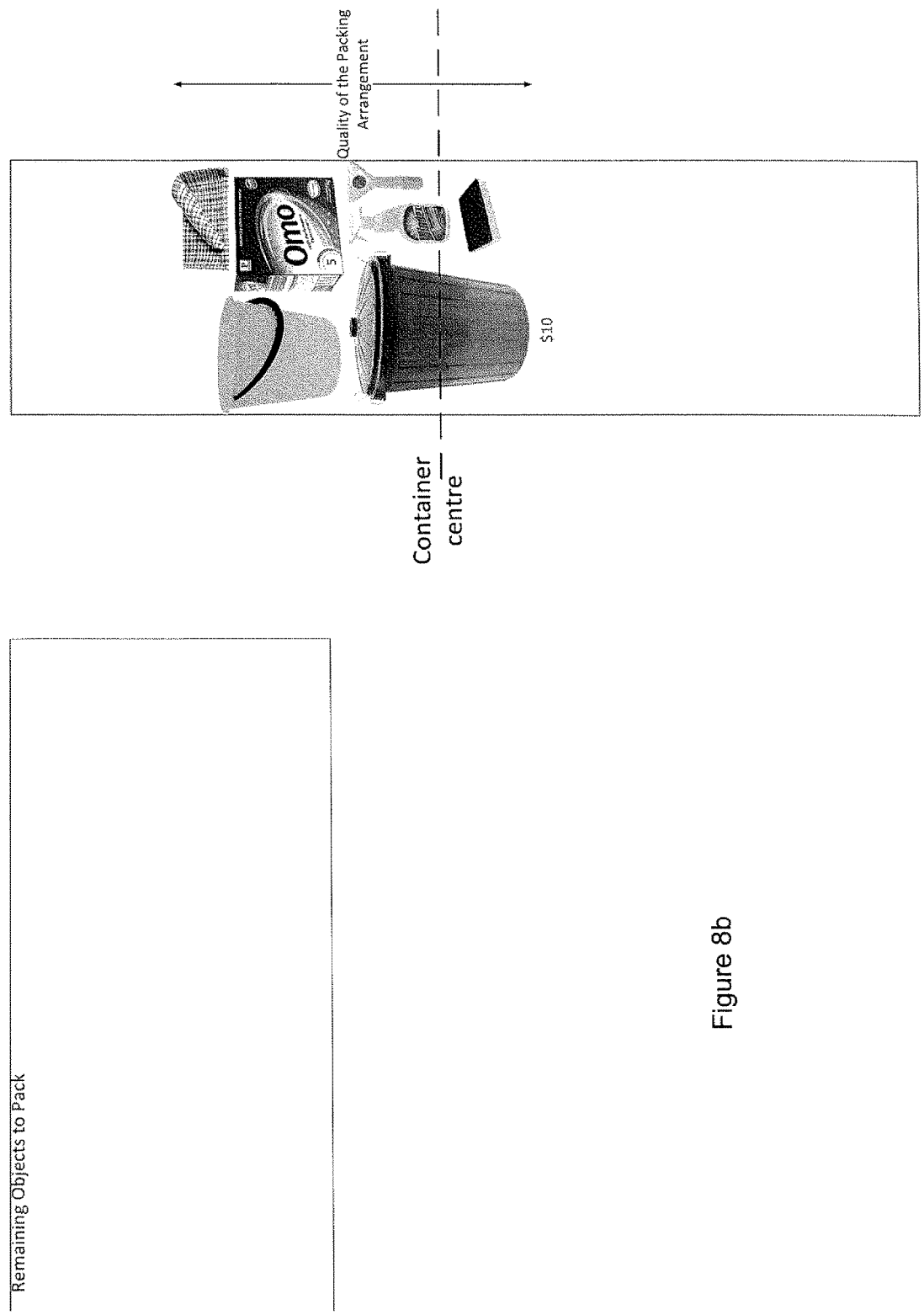

An example of packing when applying a strictness criterion of 100% to an ordering based on price, and applying a 2-D bin-packing centre-out packing approach, will now be described with reference to FIGS. 8a and 8b. As for the example described above, the packing component 203 organises the objects in a group assigned to cleaning products on the basis of price, for which the strictness criterion has been set to 100%; where objects are within the same price bracket (band), the objects within a given price bracket are ordered according to object height.

In this case, the packing component 203 uses an exhaustive search to pack the objects into the container of set width and an unbounded height, in such a way as to minimise the height of objects as they are packed into the container. As for the example described above, the objects are ordered into value brackets, and then for each bracket in turn, adds each object within a given price bracket into the container in such a way as to minimise the occupied container height.

Figure 8C:
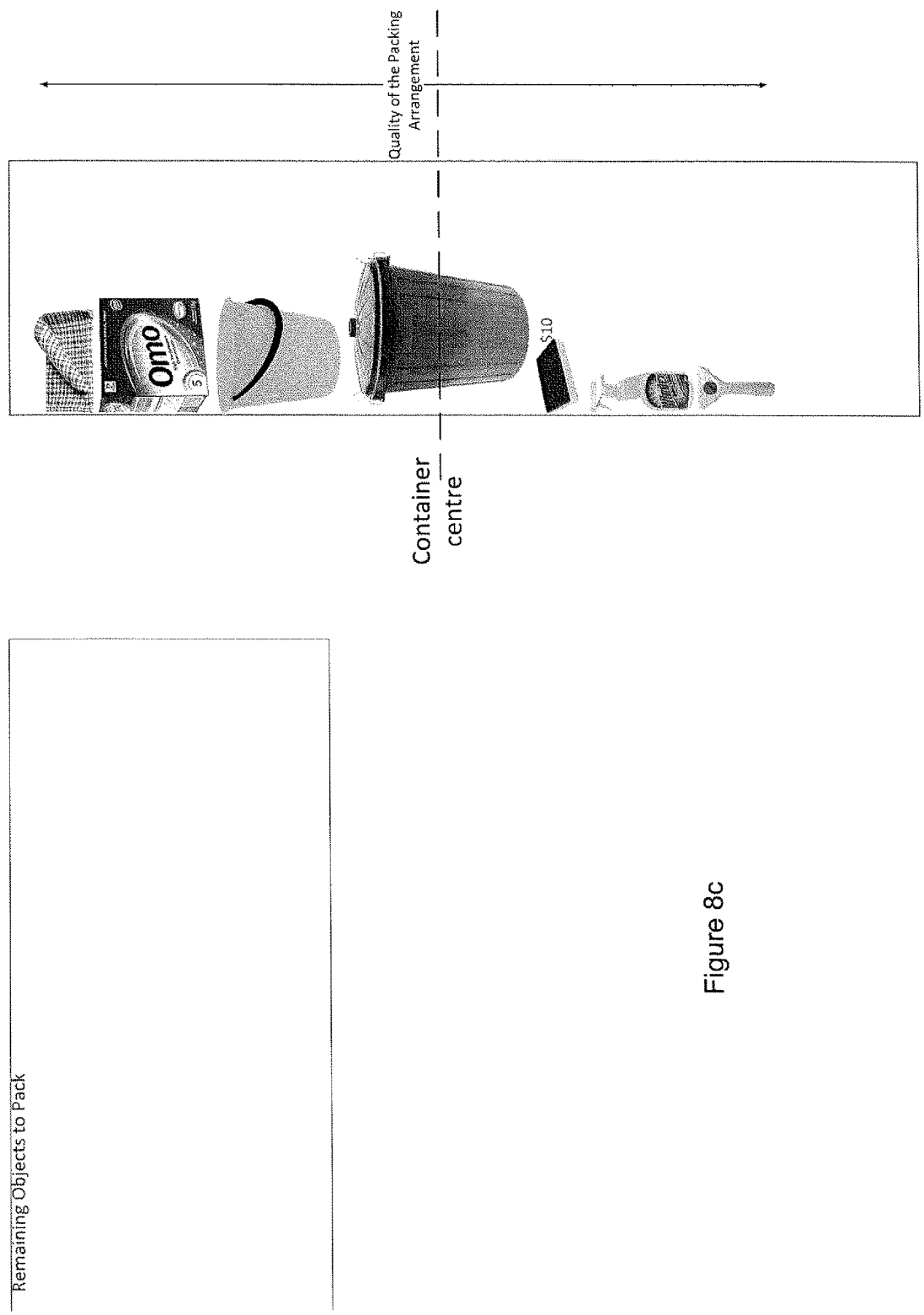

The detailed steps are as follows:
1. Divide the container into a numbered grid of squares of side length resolution units long.
2. Sort all of the objects by their value into brackets. Eg: if the bracket size is 10, then sort the objects into the following groups: [0-9, 10-19, 20-29, 30-39, ... ]—see FIG. 8a
3. For each bracket in turn, without re-arranging the objects that are already in the bin:
   a. Create a list P of the n! permutations of the order in which the objects could be added to the bin. Eg: For 3 objects ABC there are 3!=6 permutations of the order in which to place them:
      i. ABC
      ii. ACB
      iii. BAC
      iv. BCA
      v. CAB
      vi. CBA
   b. Perform an exhaustive search of all the possible valid arrangements of the objects e.g. for each permutation $P_i$ in P:
      i. For each object $O_j$ in $P_i$ in order:
         1. Create a list C of all the possible cells in which the object's centre can be placed, such that the object is adjacent to the bin centre line or at least one other cell containing an object, and it does not overlap the bin walls or any other object.
         2. For each cell $C_k$ in C place $O_j$ in $C_k$ and remove $O_j$ from $P_i$
         3. Recursively repeat steps 3.b.i, 3.b.i.1, & 3.b.i.2 until $P_i$ is empty.
         4. Calculate the distance between the lowest and highest bounds of the placed objects. This is the quality of the final arrangement of objects in the bracket.
         5. Backtrack down the recursion, recording the configuration and quality of each final arrangement.
   c. Place the objects in the configuration that corresponds to the best final arrangement: one output of the packing algorithm 203 is shown in FIG. 8b, and another is shown in FIG. 8c. Clearly the "quality" of the packing shown in FIG. 8b is higher than that shown in FIG. 8c.

The impact of the calculation complexity can be offset in a number of ways:

By pre-calculating & caching all the permutations.

By performing the calculations using several servers.

Through the use of heuristics. Eg: For the semi-sorted algorithm, the permutational complexity can be reduced by making the bracket size small and thus reducing the number of objects in each bracket.

This process is preferably repeated for each group of objects; thus, and while FIGS. 7*a*-7*z* and 8*a*-8*c* depict the operation of the packing algorithm 203 for the group "cleaning products" and for the container having size and shape shown in these Figures, the packing algorithm 203 can execute these steps for each group of products.

When all of the objects have been positioned in the containers, or the portions, the packing component 203 begins mapping the portions onto the surface of the three-dimensional structure. The packing component 203 may firstly arrange the two dimensional portions in accordance with a predetermined specification defining a spatial distribution of containers based on category type (e.g. dairy is adjacent to meat, which is adjacent to fish etc.). Once the portions have been packed and positioned in relation to one another, the result is a two dimensional array of portions. The packing component 203 then generates data indicative of the two-dimensional location of each object defined in x and y co-ordinates, where the datum of the axis is e.g. in the centre of the packed portions. The interface generator 204, utilising a 2D-to-3D projection algorithm, subsequently projects the objects on the three-dimensional surface. In the event that the three-dimensional surface corresponds to a surface of a sphere, the projection algorithm determines a location for every object on the three dimensional surface on the basis of their positioning in the packed portions.

It is to be noted that the spatial distribution (or packing) of containers can be modified in response to receipt of an instruction specifying a preferred relationship between categories; further, some categories (and thus portions) may be excluded from the 2D to 3D mapping process, resulting in a reorganisation of the portions. Such an instruction can be system generated, or generated in response to input received from the user terminal.

In order to project the user interface and the objects placed thereon onto the surface of the three-dimensional structure, the projection algorithm may utilise any suitable 2D-to-3D projection process. When the three-dimensional structure is a sphere, the projection algorithm could utilise the Sanson-Flamsteed map projection, which is an equal-area map projection which shows parallels and the equator as straight lines and other meridians as curves. The Sanson-Flamsteed map projection process determines the three-dimensional co-ordinates (x', y' and z') on the inside of the radially symmetrical three-dimensional structure on the basis of the two-dimensional front face as follows:

$x' = R \cdot \cos \phi \cdot \cos \delta$ $y' = R \cdot \sin \phi$ $z' = R \cdot \cos \phi \cdot \sin \delta$ Where R is the radius of the three dimensional object, $\phi$ is the latitude and $\delta$ is the longitude.

When the three-dimensional structure is a differently shaped object, the local curvature of the surface of the object is used to perform the 2D-to-3D projection process, which is to say that the curvature of the three-dimensional surface, at the point at which a given portion and objects assigned thereto is to be projected, is utilised to determine how to project the 2D representation onto the three-dimensional surface.

The interface generator 204 assigns a location to each object on the three-dimensional surface such that a front face (a face that is predefined as outward facing in the geometry structure 602) of each object is oriented so as to face a centre of the three-dimensional structure. Therefore, from the centre of the corresponding three-dimensional structure, each object appears to be facing its centre.

Having assigned a location to the objects, the interface generator 204 produces a series of images depicting the three-dimensional surface on which the objects are to be displayed and the three dimensional representations of the objects themselves; these can be generated in real time, e.g. using software such as is available from QuickTime™, or downloaded as prestored object representations to the client 102. These images can be overlaid with additional display items such as selection boxes/regions, which serve to enable the user to interact with the displayed objects. As a final step, a "virtual camera" is positioned at a fixed location with respect to the surface in order to focus the view on a particular location of the internal surface of the three dimensional structure, or more precisely the objects mapped thereon, as described above; the location of the virtual camera is preferably selected at a location towards the "back" of the inside of the three dimensional object and the field of view settings of the camera are adjusted so as to reduce distortion of the objects located towards the perimeter of the surface, as viewed by the user. More particularly, the virtual camera is located between half a radii and one radii from the centre of the three-dimensional structure, pointing directly through the centre point of the three-dimensional structure so that the camera target is one-and-a-half to two radii away from the camera. The target viewed by the virtual camera constitutes the interface 401. It is to be noted that the three dimensional surface can be adjusted to correspond to a barrel instead of a sphere, so as to further reduce the distortion effect.

In the event that the packing and projecting components 203, 204 are executed on the server, the server 103 can then transmit data indicative the generated interface to the client device 102. As will be appreciated, the steps carried out in relation to the positioning of the set of objects and generation of the interface 401 can be decoupled from the transmission of the data to the client device 102. For example, the client may configure the database DB1 to request and store data from the server 103 when required.

The interface 401 may be rendered on the user display in combination with further elements, which are specific to the types of objects being displayed. For example, when the objects relate to products for selection and purchase, the further elements can include a price display element displaying the price of a given selected object, a shopping cart or advertisements related to the at least some of the objects, the set of objects or a given selected object. As will also be appreciated, user interaction with the interface 401 may also alter these further elements, such as updating the shopping cart in response to the selection of a given object. The selection of a given object may also cause the interface processor to overlay a further object, related to the given selected object, on the rendered interface 401.

The user interacts with the interface 401 via feedback means on the user device; examples of suitable feedback means include: pressure sensitive touch functions known as "drag", "pinch" and "drop", which allow the user to directly identify an object within the interface 401; gaze tracker functions, which identify and highlight the object on the interface 401 being viewed by the user; keyboard shortcuts and mouse input/output functions, which enable the user to indirectly select an object on the interface 401; and an interactive voice response system, which asks audible questions based on e.g. a detected input from the user, and responds to audible commands by invoking suitable system commands.

Figure 9:
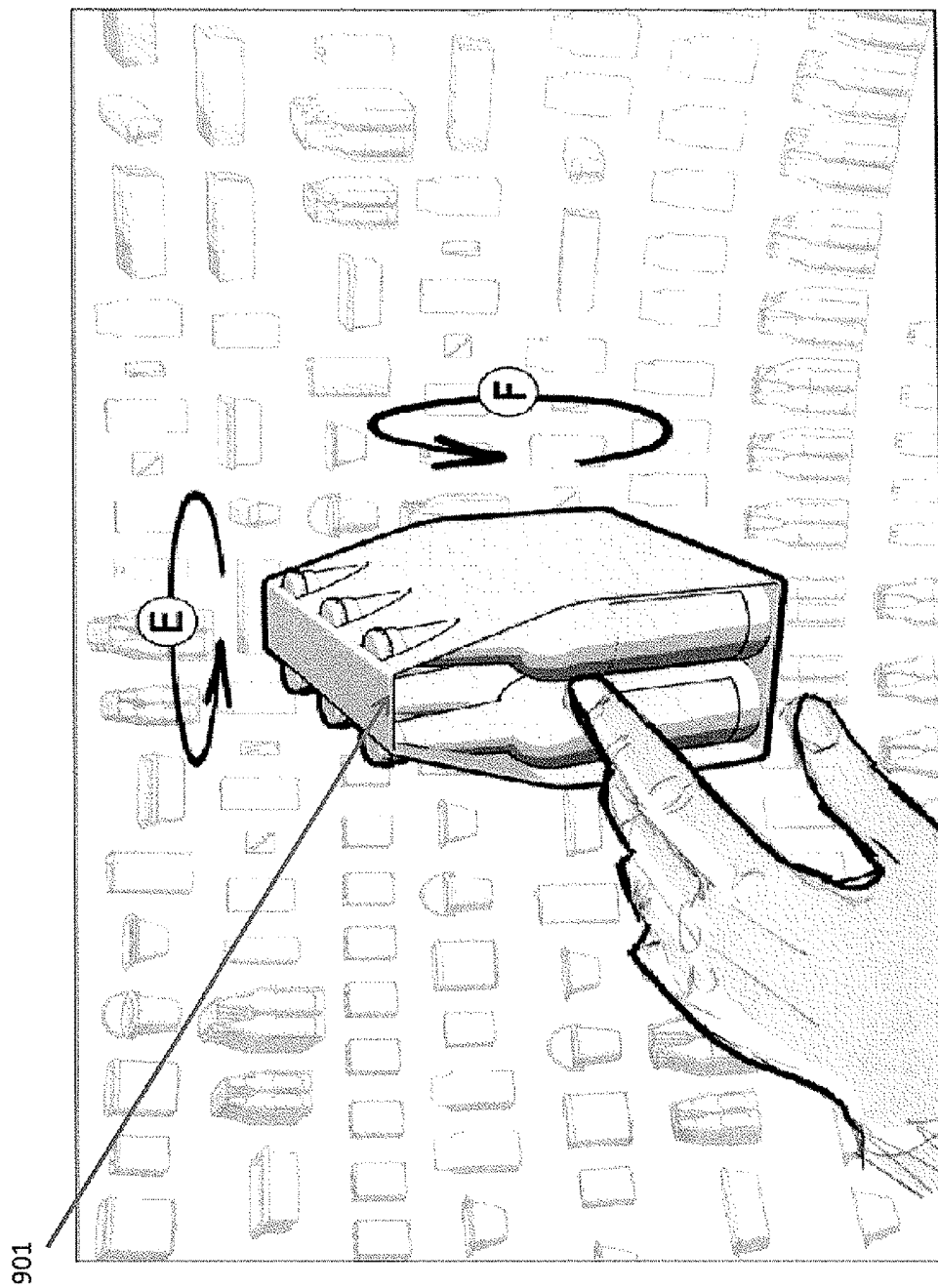
FIG. 9 shows user interactions with the interface according to an embodiment of the invention.

For example, in response to detection of an input device such as a mouse hovering over an object, or the gaze tracker identifying the user focusing on an object, the interface 401 could display a collection of related objects around the original object, together with text, or audible questions, such as "have you considered?" or "goes well with" or "people who bought this also bought . . . ". Further, by means of the afore-mentioned overlaid display items, the user can manipulate the display size of a given group of objects by zooming into the interface 401, or may alter the display size of a given object 901, as is shown schematically in FIG. 9 by orientation references E and F.

As described above, the interface 401 is rendered such that the user is only viewing a particular region of the internal surface of the three-dimensional structure, specifically the region viewed from the location of the virtual camera. The location of the virtual camera and thus region that is viewed by the user, and the related objects, is adapted to be changed or altered in response to the user feedback. The user can zoom in on or out of a specific part of the interface 401, thus displaying fewer, or more, objects. The user may also change the orientation of the three-dimensional interface, thus displaying a different region of the interface.

The above embodiments are to be understood as illustrative examples of the invention. Further embodiments of the invention are envisaged. For example, it may be the case that at least some of the objects are not associated with any categories (thus groups); these can be positioned directly on the three-dimensional surface. Such positioning of the at least some of the objects may be performed on the basis of available space on the three-dimensional surface, after the portions have been arranged.

Further, while, in the example described above, objects are positioned on a single surface that is linked to a particular three dimensional structure to generate the interface, the "surface" on which objects are to be displayed could comprise a plurality of three-dimensional surfaces, each spaced apart from one another in the radial direction and over which objects are distributed. This provides a sense of depth to the user experience.

Figure 10A:
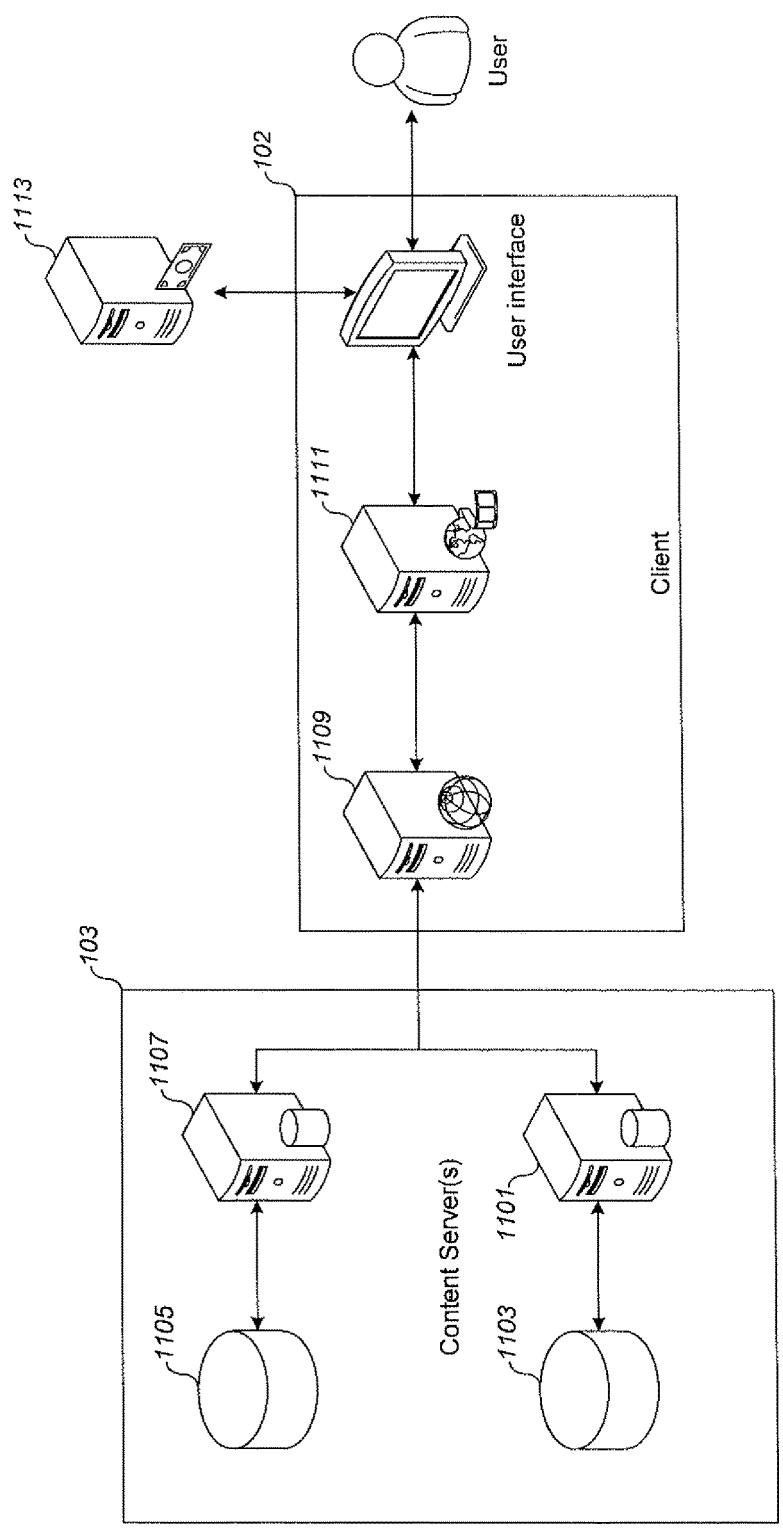
FIGS. 10a-10c are schematic block diagrams showing further implementations of the software components of FIG. 2, as regards distribution of functionality between the user terminal and the server system.

In the description above, the various software components 201, 202, 203, 204, 211, 212 are described as being distributed between the client 102 and server 103, or as residing on the client 102. FIG. 10a shows a further exemplary arrangement in which the data processing component 201 resides on a so-called geometry server 1101, and data 602 relating to the intrinsic, or physical, characteristics of objects are stored in the geometry database 1103. Product information 501 and imagery information 503 defining the extrinsic characteristics is stored in a so-called catalogue database 1105 and accessible to the geometry server 1101 via a catalogue server 1107. The scaling and packing components 202, 203 are embodied within as 3D scene generator 1109 and the interface and rendering components 204, 211, 212 are embodied within rendering engine 1111, all running locally on the client 102. In the event that the objects relate to items for purchase, an e-commerce server 1113 communicates with the client 102 to enable product selection. This arrangement is suitable when the client 102 is embodied as a standard desktop computer.

Figure 10B:
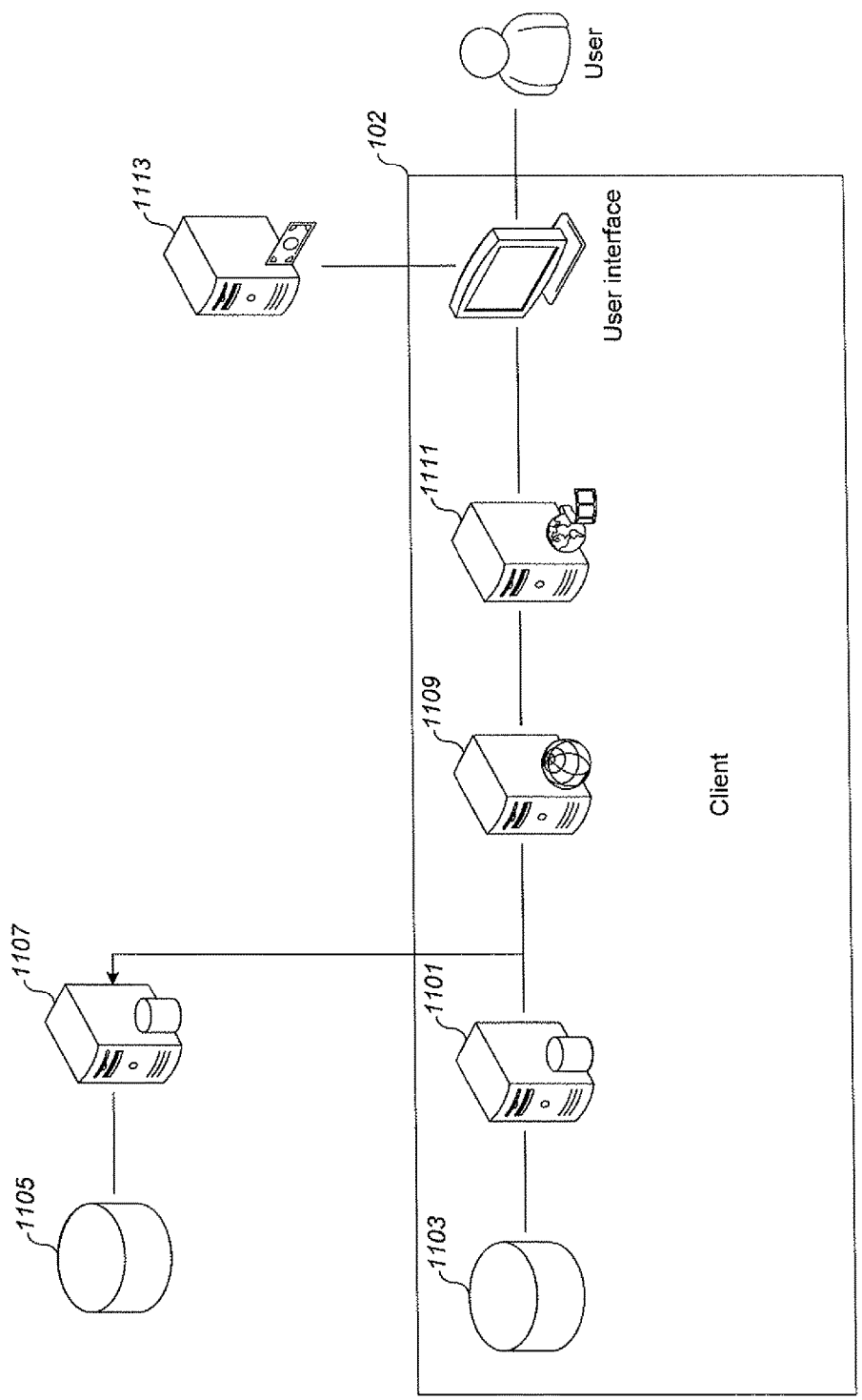
Figure 10C:
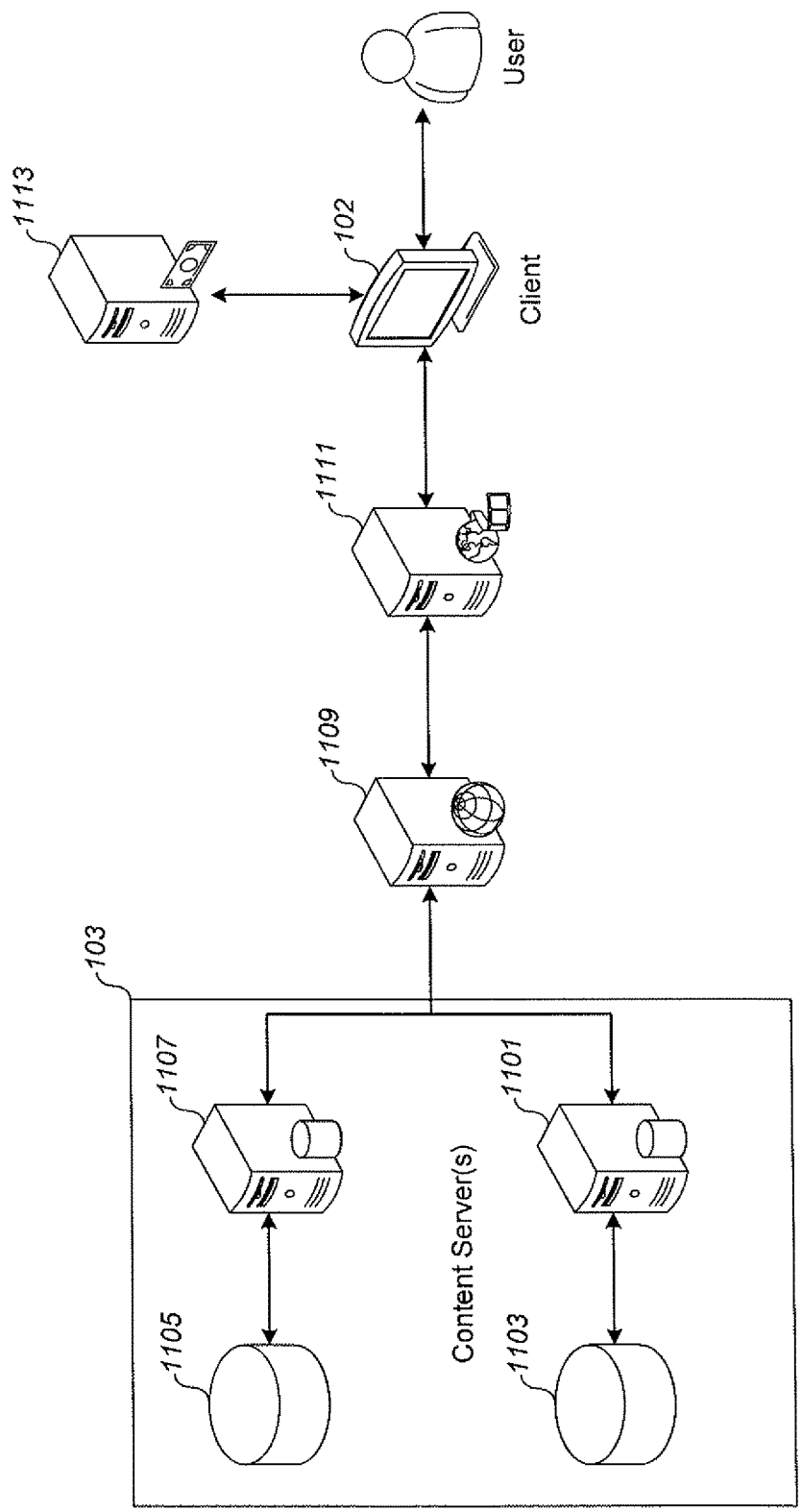

FIG. 10b shows an alternative arrangement, in which the geometry server 1101 and database 1103 reside on the client 102, with the 3D scene generator 1109 and rendering engine 1111 effectively acting as servers on the client 102; this arrangement is suitable when the client 102 is a high-performance device, and is particularly suitable for generating highly detailed models and imagery of objects. FIG. 10c shows a yet further arrangement, which is suitable for thin clients having limited graphics-processing capabilities such as an iPod™ or other smartphones: in this arrangement the scaling and packing software components 202, 203 (again, referred to as 3D scene generator 1109) are embodied within a server, communicatively separate from both the geometry server 1101 and the catalogue server 1107. The interface and rendering components 204, 211, 212 are embodied within rendering engine 1111 running on a server, which in turn is communicatively separate from the 3D scene generator 1109 server. Any one or some of these servers can be accessible via the Internet, as so-called "cloud" services, or via a LAN.

Whilst the embodiment described above is exemplified by objects representing household goods for purchase, embodiments of the invention can be applied to display objects representing any one of the following types of items: entertainment sources such as videos, DVDs, albums etc.; machinery and/or component parts thereof, such as vehicles, heavy plant machinery; vacation packages and options; communication devices, such as smartphones; contracts, such as mobile phone contracts; and insurance options, such as are available for cars, home etc. Examples of the extrinsic and intrinsic characteristics that are utilised to pack and display objects representing at least some of these items are as follows:

Intrinsic characteristics applicable to any item type: colour, size, geometry (shape), volume, proportions (length/width/depth).

Characteristics applicable to videos/DVDs: title, director, actors, year of release, language, genre, popularity, price;

Characteristics applicable to plant machinery and parts thereof: shape (e.g. number of holes, flanges etc.), size/dimensions/specifications, constituent Alloy (e.g.: type of steel), durability/hardness/expected lifetime, part number, model of vehicle to which part applies, physical location on the vehicle (e.g.: front, back, top, bottom), price, manufacturer, supply/manufacturer lead time, quantity in stock, warranty period, ISO certifications, price;

Characteristics applicable to smartphones: battery life, memory, connection capabilities, screen resolution and size, weight, finish (e.g.: plastic, brushed metal), camera specification, physical format (e.g.: flip top, touch screen, swivel), model name, manufacturer, user-contributed ratings, warranty period;

Characteristics applicable to mobile phone contracts: monthly cost, included minutes, messaging and data (local, mobile-to-mobile, international), contract duration, network provider;

Characteristics applicable to holiday bookings: location on a map, activities, distance from starting location, transport company, travel time required, holiday company, hotel chain, insurance cost, danger rating, user-contributed ratings, Michelin ratings, date availability and price; these could be combined via various metrics such as [Date Match Quality]×[Michelin Rating]/[Price] to provide a visual, comparative measure between holiday options; and Characteristics applicable to household goods (item) for purchase: manufacturer of the item, brand of the item, price of the item, origin of the item, promotion associated with the item, quality of the item, rating associated with the item (user and/or health/government), item category, discount or price reduction, quantity of item per package, carbon-neutrality and said intrinsic characteristic comprises one or more of the following: ingredients of the item, dietary content, % of Recommended dietary intake factors (e.g.: % of RDI for Fat/Salt/Sugar/Vitamins), material of the item, height of the item, shape of the item, width of the item, depth of the item, area of the item, volume of the item, circumference of the item, and perimeter of the item.

These lists are to be understood as being exemplary and non-exhaustive.

The functionality of the modules of FIG. 2 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

The aforementioned example embodiments described above can be implemented in many ways, such as program instructions for execution by a processor, as logic circuits, as an application specific integrated circuit, as firmware, etc. For example, the embodiments can be implemented as one or more software or firmware applications, computer-implemented methods, program products stored on a computer useable medium, for execution on one or more processors (e.g., CPU, microcontroller) or other computing devices in a wireless station.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A computer-implemented method of positioning a set of objects for display on a user interface, the method comprising:
    assigning the set of objects to a first two-dimensional portion among a plurality of two-dimensional portions, wherein the first two-dimensional portion has a predetermined size, and wherein each object in the set of the objects has a size in at least two dimensions and at least some of which dimensions vary between the objects;
    scaling the size of each object in relation to a first object and a second object in the set of objects, the first object having a largest value of a selected object characteristic and the second object having a smallest value of said selected object characteristic;
    identifying a bounding polygon for each object in the set of objects, wherein the bounding polygon for each object fully encloses the object, and wherein a shape of the bounding polygon for each object varies according to a shape of the object;
    for each as yet unpositioned object in the set of objects, performing a positioning process, the positioning process comprising:
    identifying object occupancy in the first two-dimensional portion; allocating the unpositioned object to a position within the first two-dimensional portion based on a predetermined separation distance between bounding polygons within the first two-dimensional portion, and unoccupied space in the first two-dimensional portion; and if a cumulative dimension of positioned objects exceed a predetermined threshold value corresponding to a dimension of the first two-dimensional portion, allocating as yet unpositioned objects to a different two-dimensional portion from the plurality of two-dimensional portions, wherein the first two-dimensional portion and the different two-dimensional portion are distinct portions with no overlay; and mapping the allocated positions to a corresponding three dimensional coordinate on the user interface, wherein the user interface is generated on a surface of a three-dimensional structure.

2. The method according to claim 1, further comprising assigning each object in the set of objects to one of a plurality of subsets of objects on the basis of a characteristic of the objects, and performing the positioning process for each subset of objects such that the positioning process comprises:
    for each of an as yet unpositioned subset of objects:
    identifying object occupancy in the portion; and allocating the objects in the as yet unpositioned subset of objects to a position within the portion on the basis of a dimension of a largest object of the as yet unpositioned subset of objects and unoccupied space in the portion.

3. The method according to claim 2, further comprising configuring the portion into a plurality of parts, the positioning process comprising:
    for each of an as yet unpositioned subset of objects:
    identifying object occupancy in the plurality of parts and selecting a part for positioning of the as yet unpositioned subset of objects on the basis of the identified object occupancy;
    allocating at least some of the objects in the as yet unpositioned subset of objects to a position within the selected part on the basis of a dimension of a largest object of the as yet unpositioned subset of objects and unoccupied space in the selected part, the allocated positions being aligned along one dimension of the portion; and
    allocating any remaining unpositioned objects in the subset of objects to a position within the selected part or within an unselected part, based on object occupancy resulting from the allocated positions.

4. The method according to claim 3, further comprising ordering the as yet unpositioned subsets of objects on the basis of an extrinsic or an intrinsic characteristic associated with the subsets of objects, said ordering being used to control the order in which the subsets of objects are positioned by the positioning process.

5. The method according to claim 1, in which the method is applied to a plurality of sets of objects, each associated with a different portion and a different category of objects, in which the objects of the different sets are allocated positions that are mapped to a distinct set of coordinates in three dimensional space.

6. The method according to claim 5, in which the portions are of varying sizes.

7. The method according to claim 5, in which the portions are positioned adjacent one another on the basis of a specified relationship between the categories of objects.

8. The method according to claim 1, in which at least some of the coordinates in three dimensional space extend beyond a facet of a display on which the user interface is displayed.

9. The method according to claim 1, in which at least some said objects represent an item for selection via the user interface.

10. The method according to claim 1, further comprising transmitting data indicative of the allocated positions in three-dimensional coordinates to a user terminal, for use in generating said user interface.

11. The method according to claim 1, in which the user interface is generated on an internal surface of the three-dimensional structure.

12. The method according to claim 11, further comprising displaying a portion of the user interface on the display of the user terminal from the perspective of a virtual camera located within the three-dimensional structure, the virtual camera being located between half a radii and one radii from the centre of the three-dimensional structure, pointing directly through the centre point of the three-dimensional structure such that a target of the camera is one-and-a-half to two radii away from the camera.

13. The method according to claim 12, in which the virtual camera is located one radii from the centre of the three-dimensional structure, such that a target of the camera is two radii away from the camera.

14. A system comprising at least one processor and at least one memory, the at least one memory being configured, with the at least one processor, for positioning a set of objects for display on a user interface of a user terminal, the system comprising:
 a storage system arranged to store data identifying each object in the set of objects, the data including data identifying said size of the objects;
 a data processing engine arranged to assign the set of objects to a first two-dimensional portion among a plurality of two-dimensional portions, wherein the first two-dimensional portion has a predetermined size, and wherein each object of the set of the objects having a size in at least two dimensions, and at least some of which dimensions vary between the objects;
 a scaling engine arranged to scale the size of each object in relation to a first object and a second object in the set of objects, the first object having a largest value of a selected object characteristic and the second object having a smallest value of said selected object characteristic;
 a packing component arranged to identify a bounding polygon for each object in the set of objects, wherein the bounding polygon for each object fully encloses the object, and wherein a shape of the bounding polygon for each object varies according to a shape of the object;
 an object positioning engine arranged to perform a positioning process for each as yet unpositioned object in the set of objects, the positioning process comprising:
 identifying object occupancy in the first two-dimensional portion; allocating the unpositioned object to a position within the first two-dimensional portion based on a predetermined separation distance between bounding polygons within the first two-dimensional portion; and
 if a cumulative dimension of positioned objects exceed a predetermined threshold value corresponding to a dimension of the first two-dimensional portion, allocating as yet unpositioned objects to a different two-dimensional portion from the plurality of two-dimensional portions, wherein the first two-dimensional portion and the different two-dimensional portion are distinct portions with no overlay; and
 mapping the allocated positions to a corresponding three dimensional coordinate on the surface of a three-dimensional structure, wherein the data processing engine is arranged to map the allocated positions to a corresponding three dimensional coordinate on the user interface, wherein the user interface is generated on a surface of the three-dimensional structure.

15. The system according to claim 14, wherein the data processing engine is further arranged to assign each object in the set of objects to one of a plurality of subsets of objects on the basis of a characteristic of the objects, and wherein the object positioning engine is further arranged to configure the positioning process to, for each of an as yet unpositioned subset of objects:
 identify object occupancy in the portion; and allocate the objects in the as yet unpositioned subset of objects to a position within the portion on the basis of a dimension of a largest object of the as yet unpositioned subset of objects and unoccupied space in the portion, the allocated positions being aligned along one dimension of the portion.

16. The system according to claim 15, wherein the data processing engine is further arranged to configure the portion into a plurality of parts, and wherein the object positioning engine is further arranged to configure the positioning process to, for each as yet unpositioned subset of objects:
 identify object occupancy in the plurality of parts and select a part for positioning of the as yet unpositioned subset of objects on the basis of the identified object occupancy;
 allocate at least some of the objects in the as yet unpositioned subset of objects to a position within the selected part on the basis of a dimension of a largest object of the as yet unpositioned subset of objects and unoccupied space in the selected part, the allocated positions being aligned along one dimension of the portion; and
 allocate any remaining unpositioned objects in the subset of objects to a position within the selected part or within an unselected part, based on object occupancy resulting from the allocated positions.

17. The system according to claim 14, in which the data processing engine is further arranged to scale the size of each object in relation to a first object and a second object in the set of objects, the first object having a largest value of a selected object characteristic and the second object having a smallest value of said selected object characteristic.

18. The system according to claim 14, in which the object positioning process is arranged to apply the positioning process to a plurality of sets of objects, each associated with a different portion and a different category of objects, in which the objects of the different sets are allocated positions that are mapped to a distinct set of coordinates in three dimensional space.

19. The system according to claim 18, in which the object positioning engine is arranged to position said portions adjacent one another on the basis of a specified relationship between the categories of objects.

20. The system according to claim 14, further arranged to transmit data indicative of the allocated positions in three-dimensional coordinates to the user terminal, for use in generating said user interface.

21. The system according to claim 14, in which the data processing engine and the object positioning engine are configured on a server system remote from the user terminal.

22. The system according to claim 21, in which the data processing engine and the object positioning engine communicate via a network communications channel.

23. The system according to claim 14, further comprising a rendering engine arranged to render said allocated object positions in three-dimensional coordinates onto an internal surface of the three-dimensional structure on the basis of the curvature of the surface, whereby to generate said user interface.

24. The system according to claim 23, wherein the rendering engine is configured on the terminal device.

25. The system according to claim 23, in which the data processing engine, the object positioning engine and the rendering engine are configured on the terminal device.

26. The system according to claim 23, wherein the rendering engine is configured on a server separate from said server system.

27. A non-transitory computer readable medium storing a computer program, or a suite of computer programs, comprising a computer-readable set of instructions for execution on a computing system, which, when executed by the computer system, causes the computer system to perform a method of positioning a set of objects for display on a user interface, the method comprising:
 assigning the set of objects to a first two-dimensional portion among a plurality of two-dimensional portions, wherein the first two-dimensional portion has a predetermined size, and wherein each object in the set of the objects has a size in at least two dimensions and at least some of which dimensions vary between the objects;
 scaling the size of each object in relation to a first object and a second object in the set of objects, the first object having a largest value of a selected object characteristic and the second object having a smallest value of said selected object characteristic;
 identifying a bounding polygon for each object in the set of objects, wherein the bounding polygon for each object fully encloses the object, and wherein a shape of the bounding polygon for each object varies according to a shape of the object;
 for each as yet unpositioned object in the set of objects, performing a positioning process, the positioning process comprising:
 identifying object occupancy in the first two-dimensional portion;
 allocating the unpositioned object to a position within the first two-dimensional portion based on a predetermined separation distance between bounding polygons within the first two-dimensional portion, and unoccupied space in the first two-dimensional portion; and
 if a cumulative dimension of positioned objects exceed a predetermined threshold value corresponding to a dimension of the first two-dimensional portion, allocating as yet unpositioned objects to a different two-dimensional portion from the plurality of two-dimensional portions, wherein the first two-dimensional portion and the different two-dimensional portion are distinct portions with no overlay; and
 mapping the allocated positions to a corresponding three dimensional coordinate on the user interface, wherein the user interface is generated on a surface of a three-dimensional structure.

* * * * *